US009240950B2

(12) United States Patent
Vedula et al.

(10) Patent No.: US 9,240,950 B2
(45) Date of Patent: Jan. 19, 2016

(54) SYSTEM AND METHOD FOR PROVIDING QUALITY OF SERVICE OVER DEDICATED LOCAL LOOP NETWORKS

(75) Inventors: Shanti Swarup Vedula, Boyds, MD (US); Douglas M. Dillon, Gaithersburg, MD (US); Jeffrey Biber, Sterling, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 6 days.

(21) Appl. No.: 13/428,323

(22) Filed: Mar. 23, 2012

(65) Prior Publication Data

US 2012/0243410 A1 Sep. 27, 2012

Related U.S. Application Data

(60) Provisional application No. 61/466,794, filed on Mar. 23, 2011.

(51) Int. Cl.
*H04W 4/00* (2009.01)
*H04L 12/851* (2013.01)
(Continued)

(52) U.S. Cl.
CPC ............ *H04L 47/24* (2013.01); *H04L 41/5025* (2013.01); *H04L 43/0888* (2013.01)

(58) Field of Classification Search
CPC .... H04W 84/18; H04W 8/26; H04L 12/5602; H04L 29/0653; H04L 12/56; H04L 47/24; H04L 43/0888; H04L 41/5025; H04B 7/2643
USPC ................. 370/310, 326, 330, 336, 345, 347, 370/318–321, 352
See application file for complete search history.

(56) References Cited

U.S. PATENT DOCUMENTS 7,174,179 B2 * 2/2007 Krebs et al. ................... 455/504
7,305,464 B2 * 12/2007 Phillipi et al. ................ 709/223
(Continued)

FOREIGN PATENT DOCUMENTS

EP 1772998 A2 4/2007

OTHER PUBLICATIONS

PCT/US13/54214 International Search Report and Written Opinion, Oct. 16, 2013.
(Continued)

*Primary Examiner* — Chandrahas Patel
*Assistant Examiner* — Lan Huong Truong
(74) *Attorney, Agent, or Firm* — Potomac Technology Law, LLC

(57) ABSTRACT

An apparatus, method, and system for quality of service over dedicated local loop networks is provided. Information regarding uplink and downlink speeds, and information regarding WAN interface protocol and encapsulation mode, is received from a network device. A link throughput limit is calculated based on the uplink speed of the network device, and a link throughput limit is set based on the calculated uplink throughput limit. An uplink network protocol overhead of the network device is calculated based on the WAN interface protocol and encapsulation mode of the uplink device and is factored in upstream available bandwidth calculations. Communication data size(s) are set based on the calculated uplink network protocol overhead. The downlink throughput limit is set to match the downlink speed based on the downlink speed and WAN network protocol overhead. The WAN network protocol overhead is factored in the downstream available bandwidth calculations and communication data sizes.

24 Claims, 13 Drawing Sheets

(51) Int. Cl.
*H04L 12/24* (2006.01)
*H04L 12/26* (2006.01)

(56) References Cited

U.S. PATENT DOCUMENTS

| | | | |
|---|---|---|---|
| 7,493,383 B1 * | 2/2009 | Mukerji | 709/223 |
| 7,573,821 B2 * | 8/2009 | Chilukoor et al. | 370/235 |
| 7,616,585 B1 * | 11/2009 | Kritov et al. | 370/252 |
| 7,778,176 B2 | 8/2010 | Morford | |
| 7,925,281 B2 * | 4/2011 | Cahn | 455/458 |
| 7,940,685 B1 | 5/2011 | Breslau et al. | |
| 7,983,239 B1 * | 7/2011 | Weinstein et al. | 370/351 |
| 8,239,570 B2 * | 8/2012 | Beeston et al. | 709/238 |
| 2002/0116501 A1 | 8/2002 | Ho et al. | |
| 2005/0025090 A1 * | 2/2005 | Klein et al. | 370/328 |
| 2008/0181108 A1 * | 7/2008 | Hashmi et al. | 370/231 |
| 2009/0216880 A1 | 8/2009 | Lepeska | |
| 2010/0027545 A1 * | 2/2010 | Gomes et al. | 370/392 |
| 2010/0118886 A1 * | 5/2010 | Saavedra | 370/465 |
| 2010/0232294 A1 * | 9/2010 | Samuels et al. | 370/235 |
| 2011/0231546 A1 * | 9/2011 | Nathanson | 709/224 |
| 2012/0078994 A1 | 3/2012 | Jackowski et al. | |
| 2013/0322255 A1 | 12/2013 | Dillon | |

OTHER PUBLICATIONS

USPTO, "International Search Report & Written Opinion", PCT App. No. PCT/US2014/050257, Nov. 18, 2014.

* cited by examiner

Fig. 7

| PEP Spoofing Selection Profile Detail : Hughes Vision-ONLINE-PRIMARY Site Name: Hughes | _ □ × |
|---|---|

Name: BTA_PEPSPF_ENGTEST     HUGHES     NMD:     BTA_REM
VISION ELEMENT MANAGER     Associated Rmote Count:     15

| General | Selection Rules | Advanced |

Selection Rules

PEP Spoofing Selection Rule List

| Rule No. | Default Rule | TCP Port List | Spoofing Parameter Set | Dest. IP Address | Dest. IP Add. Mask | Source IP Address | Source IP Add. Mask | DSCP | Mask | Spoof Optio |
|---|---|---|---|---|---|---|---|---|---|---|
| 1 | disabled | 86.80.20001 | BTA_PEPPAR_PRIOR2_AMIR1 | 0.0.0.0 | 0.0.0.0 | 0.0.0.0 | 0.0.0.0 | 0 | 0 | 255 |
| 2 | disabled | 20.21.88 | BTA_PEPPAR_PRIOR3_AMIR1 | 0.0.0.0 | 0.0.0.0 | 0.0.0.0 | 0.0.0.0 | 0 | 0 | 255 |
| 3 | enabled | | BTA_PEPPAR_PRIOR4_AMIR1 | | | | | 0 | 0 | 255 |

[ Detail ]

[ Refresh ]    [ Cancel ]    [ Enable Consistency Check? ] □

Fig. 8

| Data Rate (Kbits/sec) | Data Packet Size (Bytes) | Data Packet Size w/IPSEC Overhead | Data Packets Per Sec | Approx Ack Size w/IPSEC Overhead (bytes) | TCP Most Implementations | | | | TBP | | | |
|---|---|---|---|---|---|---|---|---|---|---|---|---|
| | | | | | Acks Per Sec | Ack Traffic % Of Bytes With IPSEC | Ack Data Burst Induced Jitter (ms) | Ack Data Burst Induced Jitter (bytes) | Acks Per Sec | Ack Traffic % Of Bytes With IPSEC | Ack Data Burst Induced Jitter (ms) | Ack Data Burst Induced Jitter (bytes) |
| 100 | 1200 | 1334 | 9.4 | 150 | 4.7 | 5.3% | 213 | 2668 | 9.4 | 10.11% | 107 | 1334 |
| 200 | 1200 | 1334 | 18.7 | 150 | 9.4 | 5.3% | 107 | 2668 | 18.7 | 10.11% | 53 | 1334 |
| 400 | 1200 | 1334 | 37.5 | 150 | 18.7 | 5.3% | 53 | 2668 | 37.5 | 10.11% | 27 | 1334 |
| 800 | 1200 | 1334 | 75.0 | 150 | 37.5 | 5.3% | 27 | 2668 | 40.0 | 5.66% | 13 | 1334 |
| 1600 | 1200 | 1334 | 149.9 | 150 | 75.0 | 5.3% | 13 | 2668 | 40.0 | 2.91% | 7 | 1334 |
| 3200 | 1200 | 1334 | 299.9 | 150 | 149.9 | 5.3% | 7 | 2668 | 40.0 | 1.48% | 3 | 1334 |

Fig. 13

SYSTEM AND METHOD FOR PROVIDING QUALITY OF SERVICE OVER DEDICATED LOCAL LOOP NETWORKS

RELATED APPLICATIONS

This application is related to and claims the benefit of priority under 35 U.S.C. §119(e) to U.S. Provisional Application Ser. No. 61/466,794 filed Mar. 23, 2011, the entirety of which is incorporated herein by reference.

BACKGROUND

The present invention relates to a system and method for establishing throughput limits and/or network configurations over a networked system.

Virtual Private Networks (VPNs) are frequently used to connect an enterprise network to one or more remote sites. A VPN permits the establishment of an encrypted data connection between a central site and one or more remote sites using a public or foreign network, such as the Internet, as an intermediary data link. A VPN allows devices within a remote site to seamlessly interact with devices in the central site or another remote site, as if they were locally situated. A VPN router is used to establish such a connection between a network at the remote site, and the central site, by providing secure broadband access to the end-users over a terrestrial broadband network. The VPN router traditionally connects to a VPN gateway at a Network Operations Center (NOC) through a third party Network Access Provider (NAP) network via a modem such as Digital Subscriber Line (DSL), T1, wireless, cable, etc. The type of modem, a component-off-the-shelf (COTS) device, installed at the remote site depends on, e.g., the customer requirements, cost, and service availability from various vendors in different geographical regions.

A service plan (e.g., DSL service plan) offered at each enterprise site's "last mile" (i.e., the link connecting a DSL modem to a DSL Access Multiplexer (DSLAM)) can vary even within a single customer network, or even for a single site over time, say, due to modem retraining. For example, a customer network could have three service plans deployed in the network with different downlink/uplink speeds, such as (1.5 Mbps/384 Kbps), (1.5 Mbps/128 Kbps), or (768 Kbps/128 Kbps), for different remote sites in the customer network. "Downlink/downstream" refers to a transmission direction from the VPN gateway/DSLAM to the VPN router. "Uplink/upstream" refers to the transmission direction from the VPN router to the DSLAM/VPN gateway. This variation in the offered service plans is due to varying circuit characteristics, and the pricing from different DSL vendors in different geographical regions.

To avoid over-driving a last-mile link, the effective throughput limits in each transmission direction must be established and obeyed. Otherwise, the overloaded last-mile link will cause increased latency and/or packet loss.

An important factor to be taken into account for throughput limit calculations is the encapsulation overhead incurred by each IP packet as it traverses down each protocol layer. The particular protocol layers will depend on an underlying network infrastructure. For example, when the IPSec protocol is used, encryption of an IP packet over a VPN tunnel will incur an IPSec overhead.

Since the encapsulation overhead is non-trivial and varies with packet size and with the site-specific networking technology, it is important for a "throughput limiter" (e.g., packet scheduler) at each VPN peer (i.e., the VPN router and the VPN gateway) to take into account the actual underlying network protocol overhead in its available bandwidth calculations in order to avoid buffer overflows by the DSLAM and the DSL modem. Furthermore, the overhead information may be useful in setting the path Maximum Transmission Unit (MTU) and the Transmission Control Protocol (TCP) Maximum Segment Size (MSS) accordingly to avoid packet fragmentation. The VPN gateway may particularly benefit from this information as it communicates with different VPN routers operating in different types of underlying network infrastructures—including non-dedicated local loop networks such as cable and wireless.

Avoiding packet fragmentation not only improves Quality of Service (QoS) but also results in efficient link utilization at each site. In order to figure out the above information, a VPN router should at least know two key configuration parameters from the DSL modem: (1) the WAN Protocol in use (e.g., RFC 2684 Bridged, RFC 2684 Routed, PPPoA, PPPoE); and (2) the ATM Encapsulation Mode (e.g., LLC, VC MUX). Another important factor that should be taken into consideration in a throughput analysis is QoS.

End-user traffic typically consists of: (1) real-time traffic such as voice, (2) interactive traffic such as web browsing and Point-Of-Sale (POS) transactions, and (3) bulk traffic such as FTP. When a VPN peer is given a mix of all types of traffic, real-time traffic gets the most preferential treatment followed by the interactive traffic. In order to provide QoS in such a system, it is well known to those skilled in the art that traffic needs to be classified and prioritized.

However, since the "last mile" in a dedicated local loop network such as DSL operates at significantly lower link speeds compared to the rest of the network, it is important for VPN routers to limit the data throughput in order to ensure that uplink throughput does not exceed the modem's uplink speed. Otherwise, data would pile up in a first-in-first-out (FIFO) fashion in VPN routers, causing increased latency for all packets and, if persistent, causing buffer overflows and packet losses. The net effect would be poor QoS despite the traffic classification and prioritization.

Since the real-time and interactive traffic is bidirectional, it therefore becomes equally important to limit the per-site throughput at the VPN gateway in the downlink direction to ensure that downlink throughput does not exceed the downlink speed at the last mile for the particular site. Otherwise, data would pile up in the DSLAM causing similar increased latency and, if persistent, packet loss.

In summary, an end-to-end throughput limit configuration setup that matches the last mile link speeds is essential to guarantee QoS.

However, since the last-mile link speeds are site-specific and time-varying, a priori throughput limit configuration at a VPN router, and at a VPN gateway, to match each remote site's uplink and downlink speed, respectively, is not practical in a large enterprise network.

Typically, the throughput limits for a VPN router and a VPN gateway, if set, are set to default "one-size-fits-all" values to match the maximum available link speeds in the network. However, this approach presents problems.

For example, a default per-site setting may be employed where the downlink throughput limit is set to 1.5 Mbps at the VPN gateway and the uplink throughput limit is set to 384 Kbps at the VPN router. In this case, a DSL modem having only a 768 Kbps downlink limit and a 128 Kbps uplink limit could be overdriven.

Accordingly, what is needed is a system and method to automatically monitor the last-mile link speeds at each site and automatically set the throughput limit at each VPN peer to match the link speeds.

What is also needed is a system and method whereby the VPN router automatically discovers the network protocols at each site, automatically sets network configurations such as path MTU and TCP MSS in accordance with the employed network protocols, and factors in the network protocol overhead in its available bandwidth calculations; and in combination with this, a system and method to convey the network protocol overhead to the VPN gateway to aid in available bandwidth calculations in the downlink direction.

What is further needed is a system and method to also automatically adjust the throughput limit values in cases where a modem re-trains to different speeds.

What is ultimately needed is a system and method whereby a VPN router queries its DSL modem periodically for its link speeds and uses the learned uplink speed to limit the throughput in the uplink direction, in combination with a system and method to convey the learned downlink speed to a VPN gateway to limit the throughput for each site in the downlink direction to match its downlink speed.

In yet another concern, in a broadband VPN network, the speed of the links after the last mile (i.e., backbone links) are so much faster than an individual broadband connection's speed that: (1) responding to congestion in the backbone of the network by a single remote site does not materially change the congestion; and (2) congestion in the backbone of the network is primarily experienced as packet loss and not by significant changes in latency. As such, taking steps to respond to congestion is important.

Existing TCP acceleration methods use, e.g., a Performance Enhancing Proxy (PEP), to enhance performance of a communications network. See, e.g., U.S. Pat. Nos. 6,973,497, 7,006,480, 7,082,467, 7,219,158, 7,389,533, 7,398,552 and 7,643,416, the entireties of which are incorporated by reference herein. As is well known to those skilled in the art, TCP acceleration may be performed by "spoofing" TCP and carrying the resulting TCP traffic multiplexed on backbone connections (one backbone connection per QoS classification).

Therefore, there is a need for an enhancement to such TCP acceleration methods, to provide good quality of service even in the face of congestion in the non-last mile (i.e., backbone) segments of the network.

SOME EXEMPLARY EMBODIMENTS

According to one embodiment, an apparatus comprises receiving means for receiving, from a network device, information regarding the network device's uplink speed, and information regarding the network device's WAN interface network protocol and encapsulation mode. The apparatus further comprises first calculating means for calculating an uplink throughput limit, in accordance with the received information regarding the network device's uplink speed, and first setting means for setting the uplink throughput limit of the apparatus to the calculated uplink throughput limit. In addition, the apparatus comprises second calculating means for calculating an uplink network protocol overhead in an uplink transmission direction of the network device, in accordance with the received information regarding the network device's network protocol and encapsulation mode, and second setting means for setting at least one communication data size for the apparatus in accordance with the calculated uplink network protocol overhead.

According to another embodiment, an apparatus comprises at least one hardware processor; at least one hardware memory storing a control program to be executed by the processor; and a hardware network interface. The control program comprises code for receiving, from a network device, the network device's link speed, and the network device's WAN interface network protocol and encapsulation mode. The control program further comprises code for calculating a link throughput limit, in accordance with the received link speed, and code for setting the link throughput limit of an apparatus to the calculated link throughput limit. In addition, the control program further comprises code for calculating, with a processor, a link network protocol overhead in a transmission direction of the network device, in accordance with the received network protocol and encapsulation mode, and code for setting at least one communication data size for the apparatus in accordance with the calculated network protocol overhead.

According to a further embodiment, a method comprises receiving, from a network device, the network device's uplink speed, and the network device's WAN interface network protocol and encapsulation mode. The method further comprises calculating an uplink throughput limit, in accordance with the received uplink speed, and setting the uplink throughput limit of an apparatus to the calculated uplink throughput limit. In addition, the method further comprises calculating an uplink network protocol overhead in an uplink transmission direction of the network device, in accordance with the received network protocol and encapsulation mode, and setting at least one communication data size for the apparatus in accordance with the calculated uplink network protocol overhead.

Thus, the present invention provides a system and method whereby a VPN router queries a modem for the information pertaining to its WAN interface's (underlying) network protocol and ATM encapsulation mode in use. The VPN router uses this information to compute the network protocol overhead associated with the data transmission on the network in the uplink direction. A mechanism is also provided to convey this information to a VPN gateway to account for the network protocol overhead in its throughput calculations associated with data transmission on the network in the downlink direction. Both the VPN peers (i.e., the VPN router and the VPN gateway) also use this information to set their MSS and MTU settings accordingly.

The present invention also provides a system and method to extend existing TCP acceleration methods by: having a backbone protocol which is able to quickly and efficiently recover from lost packets; performing flow control of a backbone connection based on its round trip latency rather than the more commonly used equating of packet loss with congestion; and spoofing the MSS negotiation that takes place during TCP connection establishment to arrive at an MSS which avoids fragmentation and which efficiently uses the underlying transport, for example, by picking a size which fills (or nearly fills) the last ATM cell such that the ATM cell carries a full-sized IPSECed packet.

Still other aspects, features, and advantages of the invention are readily apparent from the following detailed description and accompanying drawings, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

FIG. 7 is a diagram depicting as a graphical user interface (GUI), in accordance with various exemplary embodiments.

FIG. 8 is a diagram depicting a GUI, in accordance with various exemplary embodiments.

FIG. 13 is a table depicting the utilization of network capacity during a bulk transfer and comparing TBP to ordinary TCP, in accordance with various exemplary embodiments.

DETAILED DESCRIPTION

An apparatus, method, and system for quality of service over dedicated local loop networks are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

VPN System

Figure 1:
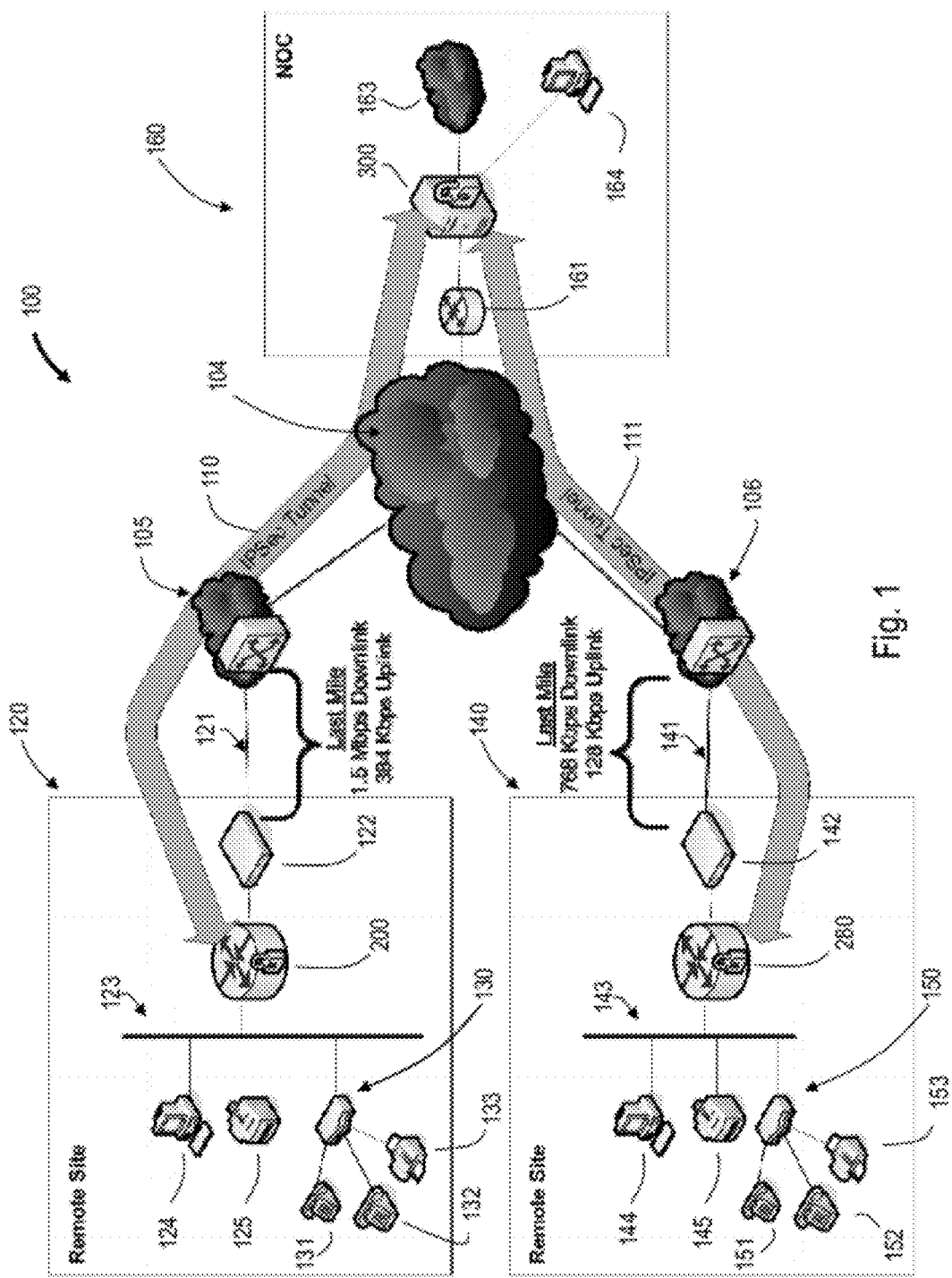
FIG. 1 is a diagram depicting a Virtual Private Networks (VPN) system, in accordance with various exemplary embodiments.

FIG. 1 is a diagram of a VPN system 100, in accordance with various exemplary embodiments. The VPN system 100 includes a Network Operations Center (NOC) 160 and one or more remote sites. For the purpose of illustration, FIG. 1 depicts two remote sites 120 and 140. However, it will be appreciated that VPN system 100 may be configured with a single remote site or with more than two remote sites.

The NOC 160 includes a router 161, a VPN gateway 300, an enterprise network 163, and a network manager apparatus 164. Router 161 routes data between the Internet 104 and VPN gateway 300, which in turn, provides VPN access to enterprise network 163. The network manager apparatus 164 is connected to VPN gateway 300 via a management interface (e.g., dedicated network interface), and configures and monitors VPN routers 200 and 280, and VPN gateway 300, as will be later described.

The remote site 120 includes a VPN router 200, a Digital Subscriber Line (DSL) modem 122, and a local area network (LAN) 123. The LAN 123 interconnects VPN router 200 with various devices, such as a computer 124, a Point of Sale (POS) transaction machine 125, and an Analog Telephone Adapter (ATA) 130. The ATA 130 is a component that provides Voice over IP (VoIP) services with the enterprise network 163 (i.e., between remote site 120 and enterprise network 163). The ATA 130 allows connectivity of phone-related components, such as telephones 131 and 132, a fax machine 133, or any other components which connect over a phone line.

The DSL modem 122 provides connectivity between VPN router 200 and a Network Access Provider (NAP) network 105. The NAP network 105 includes various components, for example, a DSL Access Multiplexer (DSLAM), for connecting remote site 120 to the Internet 104. DSL modem 122 is connected with NAP network 105 over a data link 121, which is commonly referred to as the "last-mile" link between NOC 160 and remote site 120. That is, in a DSL connection, the last-mile link is the link connecting the DSL modem to the DSLAM. In this case, last-mile link 121 is a 1.5 Mbps downlink, 384 Kbps uplink connection.

Thus, an Internet Protocol Security (IPSec) tunnel 110 is formed between NOC 160 and remote site 120, using the data connections therebetween. That is, data transmissions from remote site 120 to NOC 160 are encapsulated into IPSec packets by VPN router 200. The IPSec packets are sent over the Internet 104 and received by VPN gateway 300 at NOC 160, which decapsulates the IPSec packets to obtain the data transmission. At the same time, data transmissions from NOC 160 to remote site 120 are also encapsulated into IPSec packets, by VPN gateway 300. The IPSec packets are sent over the Internet 104 and received by VPN router 200, which decapsulates the IPSec packets to obtain the data transmission.

The remote site 140 includes a VPN router 280, DSL modem 142, and a LAN 143. The LAN interconnects VPN router 280 with various devices, such as a computer 144, a POS transaction machine 145, and an ATA 150. The ATA 150 allows connectivity of phone-related components, such as telephones 151 and 152, a fax machine 153, or any other components which connect over a phone line.

The DSL modem 142 provides connectivity between VPN router 280 and a NAP network 106. The NAP network 106 contains various components, for example, a DSLAM, for connecting remote site 140 to the Internet 104. The DSL modem 142 may be connected with NAP network 106 over a data link 141, which is referred to as the "last-mile" link between NOC 160 and remote site 140. In this case, last-mile link 141 is a 768 Kbps downlink, 128 Kbps uplink connection. Thus, an Internet Protocol Security (IPSec) tunnel 111 is formed between NOC 160 and remote site 140, using the data connections therebetween.

The Packets sent over tunnels 110 and 111 may be configured as standard IP packets according to TCP or UDP. However, in various embodiments, the system 100 incorporates a TCP Performance Enhancement Proxy (PEP).

In yet further embodiments, both the VPN router 200 and the VPN gateway 300 use an enhanced version of a TCP PEP from Hughes Network Systems which utilizes an optimized backbone protocol, referred to as the Terrestrial-Broadband Backbone Protocol (TBP), to carry TCP traffic across the terrestrial broadband network. The TBP automatically measures and adjusts to available capacity providing performance gains over native TCP across such DSL, EVDO, T1 and other networks, especially when operating over networks where there is congestion in the network beyond the last mile. TBP more effectively recovers from packet loss than native TCP. The enhanced PEP solution has TCP connections run with an MSS which is efficiently carried by the underlying transport and which avoids packet fragmentation. When compared with native TCP, TBP makes TCP traffic operate with more consistent, and with better performance across broadband networks with congested last, middle and/or public Internet hops.

VPN Router

Figure 2:
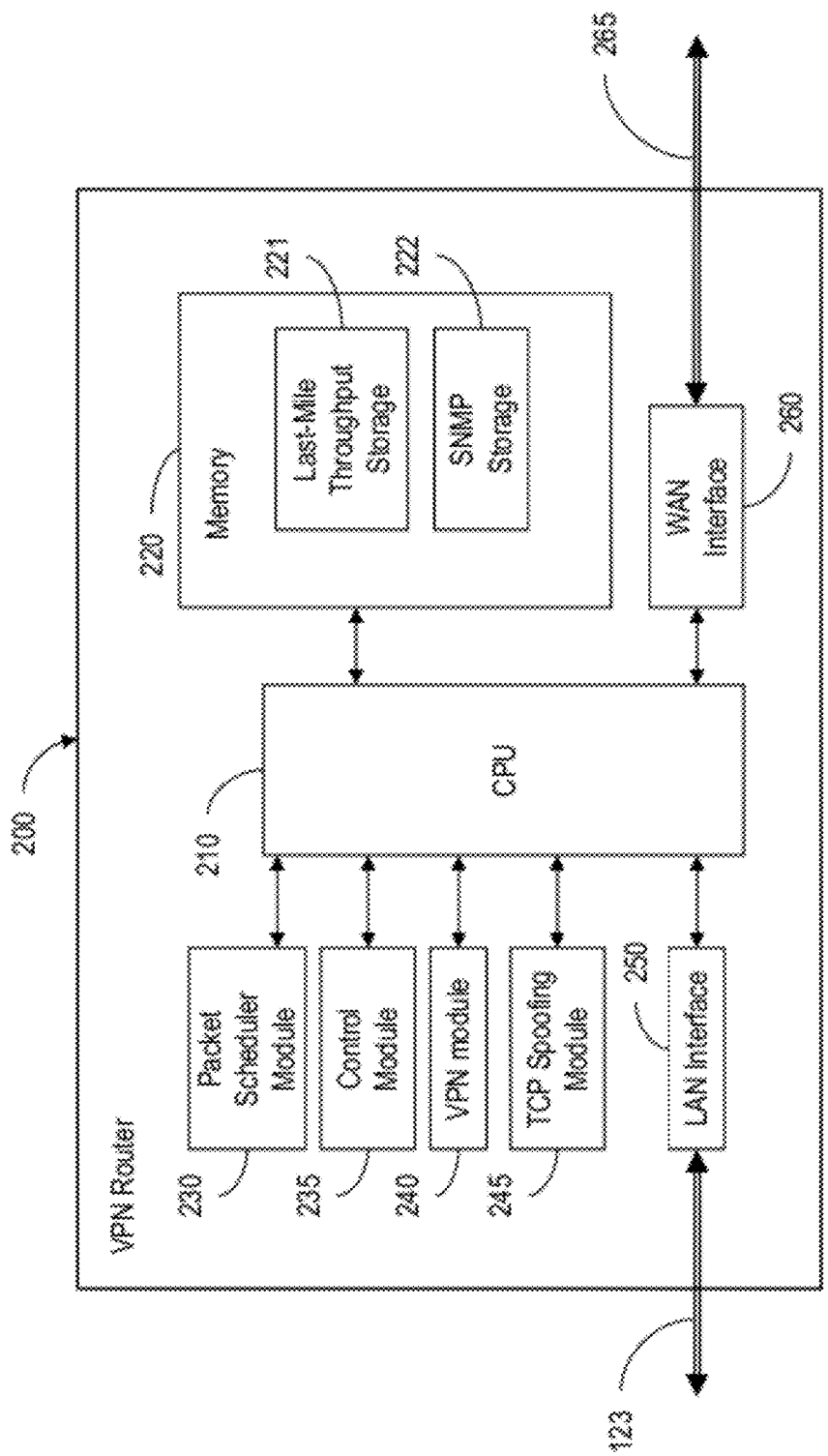
FIG. 2 is a diagram of a VPN, in accordance with various exemplary embodiments.

FIG. 2 depicts a block diagram of the VPN router 200. The VPN router 200 includes a CPU 210 and a memory 220. The memory 220 may include both flash memory and RAM, but may alternatively or additionally include other data storage such as ROM or hard disk. The VPN router 200 may also include a LAN interface 250 and a wide area network (WAN) interface 260.

The LAN interface 250 is connected to the LAN 123, such as an Ethernet network. As discussed above, the LAN 123 is attached to networked devices including computer 124, POS transaction machine 125, and ATA 130. However, it is appreciated that networked devices are not limited to such, but can also include, printers, scanners, copiers, VoIP devices, or any other network-enabled electronic device. These devices send and receive data over LAN 123. Alternatively, it will be understood that any form of data connectivity other than a LAN may be used, as long as data is transferred between VPN router 200 and the devices.

The WAN interface 260 is connected to a data link 265, which connects VPN router 200 with DSL modem 122, as depicted in FIG. 1.

The VPN router 200 further includes a packet scheduler module 230, a control module 235, a VPN module 240 and a TCP spoofing module. The packet scheduler module 230 shapes outgoing traffic to be sent by VPN router 200, to optimize the uplink throughput over last-mile link 121. These data packets are packets destined for the enterprise network 163, primarily sent by devices on LAN 123. The control module 235 controls the operation of VPN router 200, including various calculations such as the calculation of throughput speed(s). VPN module 240 performs VPN functions according to, e.g., the IPSec protocol. That is, VPN module 240 encapsulates and encrypts outgoing VPN packets, which are ultimately sent from VPN router 200 to VPN gateway 300 using WAN interface 260, and decapsulates and decrypts incoming VPN packets received from VPN gateway 300 by VPN router 200 using WAN interface 260. The TCP spoofing module 245 handles the TCP spoofing protocols. In various embodiments, the control module 235 carries out all functions performed by the VPN router 200. In yet further embodiments, other modules could be incorporated to carry out one or more functions performed by the VPN router 200.

Unless stated otherwise, all modules are software components which are stored in a memory and executed by CPUs of the respective devices. However, it will be appreciated that the modules could alternatively be constructed as hardware components or a combination of hardware and software components.

In certain embodiments, the memory 220 includes a last-mile throughput storage 221 and an SNMP storage 222. The last-mile throughput storage 221 may be utilized for storing the throughput characteristics of DSL modem 122 and the calculated throughput limits of VPN router 200, and SNMP storage 222 is for storing SNMP content. The SNMP storage 222 stores status/statistics information relating to polled SNMP variables of devices attached via LAN interface 176 (e.g., ATA) or WAN interface 174 (e.g., DSL modem 122), which are periodically monitored by VPN router 200. The VPN router 280, corresponding to remote site 140, has similar features.

VPN Gateway

Figure 3:
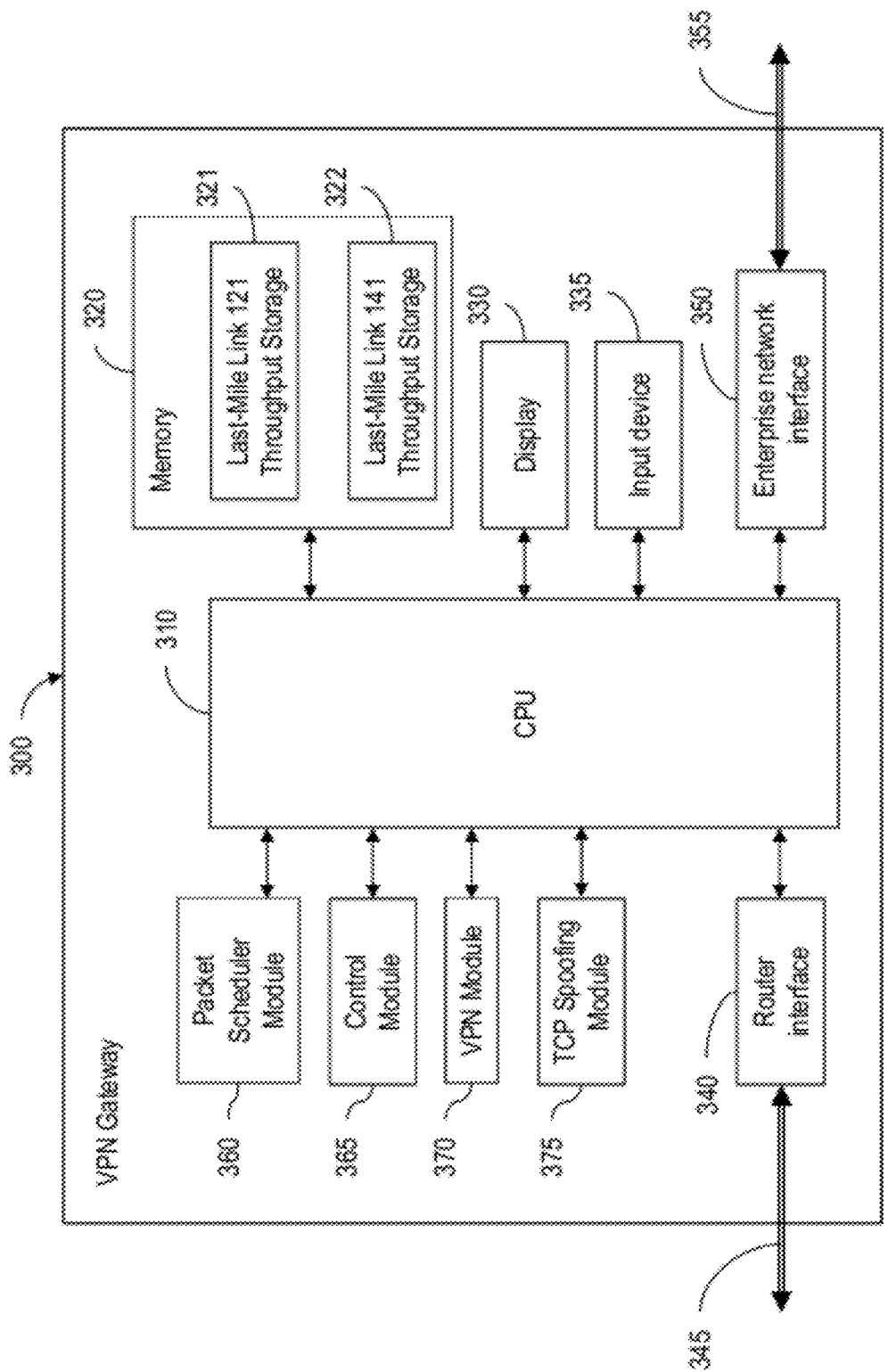
FIG. 3 schematic diagram of a VPN gateway, in accordance with various exemplary embodiments.

FIG. 3 depicts a block diagram of the VPN gateway 300. The VPN gateway 300 includes a CPU 310 and a memory 320. The memory 320 includes last-mile-link-121 throughput storage 321 and last-mile-link-141 throughput storage 322. The storage 321 stores information relating to the throughput of last-mile link 121, while storage 322 stores information relating to the throughput of last-mile link 141. The VPN gateway 300 receives data from VPN routers 200 and 280 for storing in storage 321 and 322, respectively, as will be later explained.

The memory 320 may contain two storages 321 and 322. However, it is understood that memory 320 may contain only a single storage, or more than two storages, depending on, for example, the number of remote sites involved in the VPN system.

The VPN gateway 300 also includes a display 330 for displaying information to a user, and an input device 335 for a user to input information. The display 330 may include, for instance, a CRT or LCD monitor, but is not limited to such. Input device 335 may include a keyboard and/or a mouse, but is not limited to such.

The VPN gateway 300 also includes a router interface 340 and an enterprise network interface 350. The router interface 340 connects VPN gateway 300 with router 161 using data link 345. The enterprise network interface 350 connects VPN gateway 300 with enterprise network 163 using data link 355. The data link 355 may be a network connection, but is not limited to such.

The VPN gateway 300 further includes a packet scheduler module 360, a control module 365, a VPN module 370 and a TCP spoofing module 375. The packet scheduler module 360 shapes outgoing traffic to be sent by VPN gateway 300 to VPN router 200, to optimize the downlink throughput over last-mile link 121. These data packets are packets destined for remote site 140, primarily sent by devices on enterprise network 163. The control module 365 controls the operation of VPN gateway 300, including various calculations such as the calculation of throughput speeds. The VPN module 370 performs VPN functions according to, e.g., the IPSec protocol. That is, the VPN module 370 encapsulates and encrypts outgoing VPN packets, which is ultimately sent from VPN gateway 300 to VPN router 200 using router interface 340, and decapsulates and decrypts incoming VPN packets received from VPN router 200 by VPN gateway 300 using router interface 340. The TCP spoofing module 245 handles the TCP spoofing protocols. In certain embodiments, the control module 365 carries out all functions performed by the VPN gateway 300. In other various embodiments, other modules can be configured to carry out one or more functions performed by the VPN gateway 300.

In addition to the VPN router 200 at remote site 120, packet scheduler module 360, control module 365, and VPN module 370 perform their respective functions in relation to the VPN router 280 at remote site 140.

Unless stated otherwise, all modules are software components which are stored in the memory and executed by CPUs of the respective devices. However, it will be appreciated that the modules could alternatively be constructed as hardware components or a combination of hardware and software components.

Network Protocol Overhead

As depicted in FIG. 1, the remote sites 120 and 140 have different DSL service plans connecting to the same VPN gateway in NOC 160.

It is extremely important to restrict the throughput limit in each direction (i.e., downlink and uplink) through last-mile links 121 and 141 of remote sites 120 and 140, respectively, to make sure that each throughput does not exceed the maximum speeds of DSL modems 122 and 142. That is, the VPN routers 200 and 280 must ensure that their respective uplink throughputs do not exceed the uplink speeds of DSL modems 122 and 142, respectively. At the same time, the VPN gateway 300 must ensure that the downlink throughputs to remote sites 120 and 140 do not exceed the downlink speeds of DSL modems 122 and 142, respectively. Throughput must be restricted so that packets are not lost due to buffer overflow, or delayed significantly by queuing up in the DSL modem and DSLAM.

Notably, data packets contain a header section and a payload section. The header section is required to successfully deliver the packet, but causes a certain amount of network protocol overhead in accordance with the particular network protocol.

Figure 4:
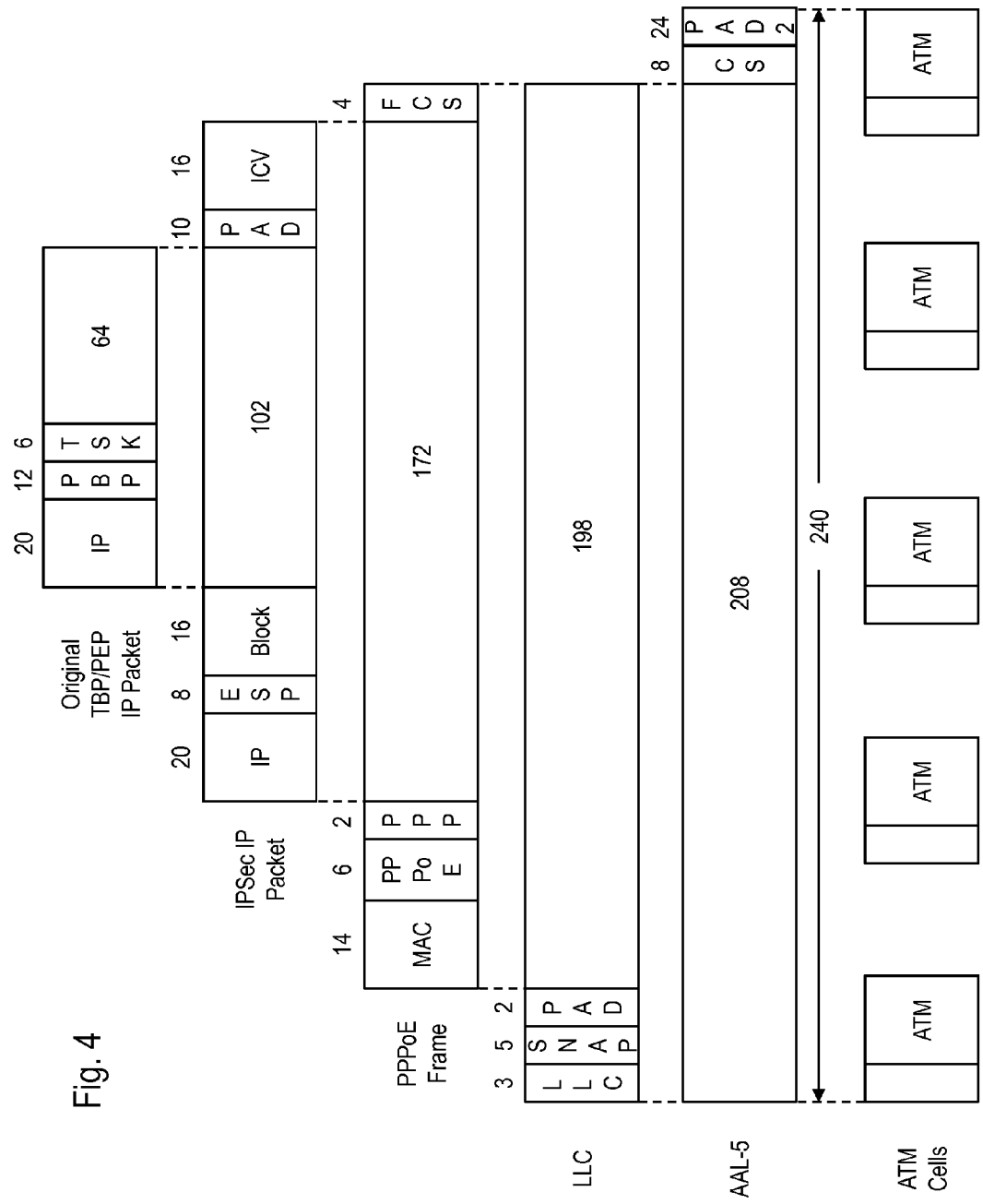
FIG. 4 is a diagram of a first example for encapsulating an Internet Protocol (IP) packet, in accordance with various exemplary embodiments.

FIG. 4 depicts a first example of encapsulating an IP packet, according to a Point-to-Point Protocol (PPP) session running over Ethernet (PPPoE) involved with LLC encapsulation. As depicted in FIG. 4, the original IP packet is encapsulated into an IPSec packet, which gets encapsulated into a PPPoE and LLC frame which then gets transported in an AAL-5 PDU in ATM cells across an ATM network.

Figure 5:
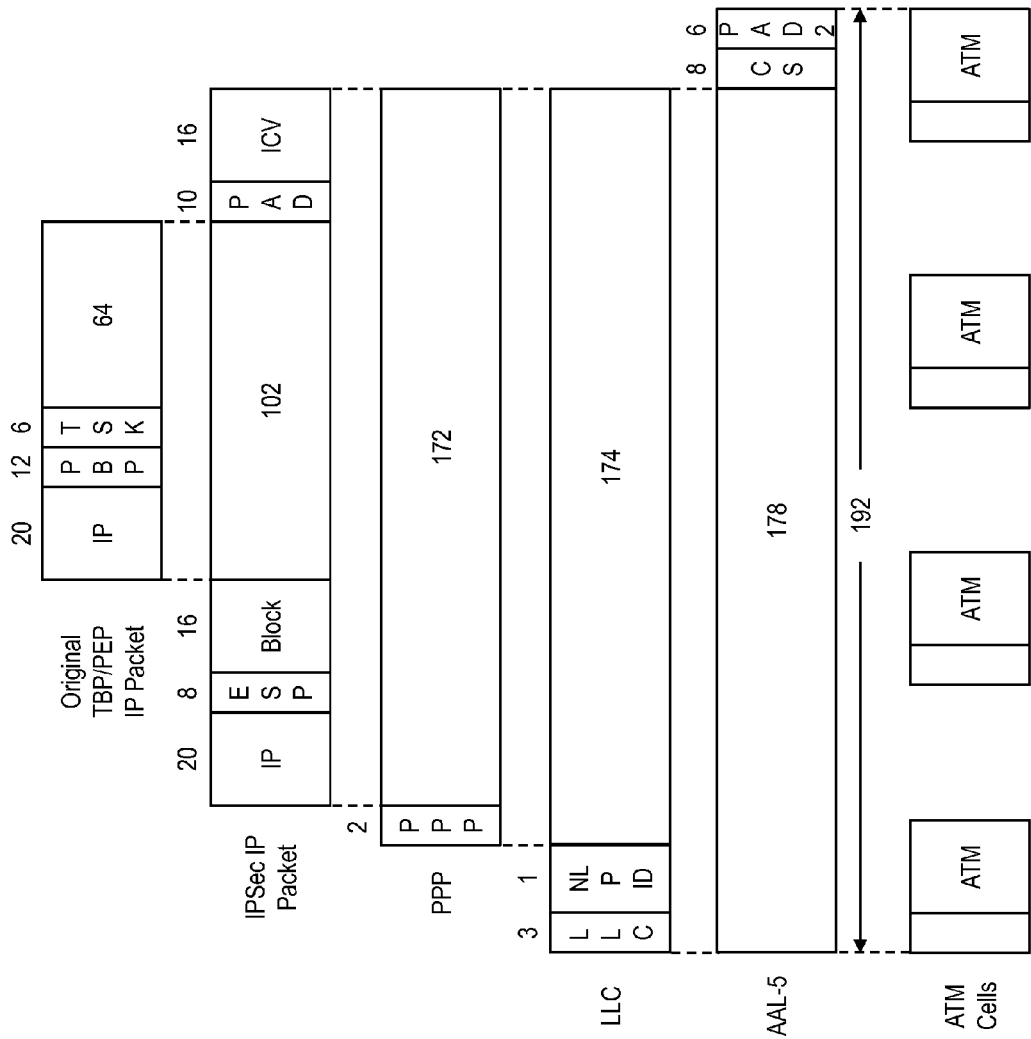
FIG. 5 is a diagram of a second example for encapsulating an IP packet, in accordance with various exemplary embodiments.

FIG. 5 depicts a second example of encapsulating an IP packet, according to a PPP session over AAL5 (PPPoA) option. As depicted in FIG. 5, the PPPoA encapsulation overhead is clearly different from that of the PPPoE, because the IPSec packet is encapsulated into a PPP frame instead of a PPPoE frame.

Packet Scheduler

The packet scheduler modules 230 and 360 both operate in a similar fashion, in that the modules perform traffic shaping of outgoing data. The packet scheduler module 230 shapes outgoing traffic in the uplink direction from VPN router 200 to VPN gateway 300. Conversely, the packet scheduler module 360 shapes outgoing traffic in the downlink direction from VPN gateway 300 to VPN router 200.

Figure 6:
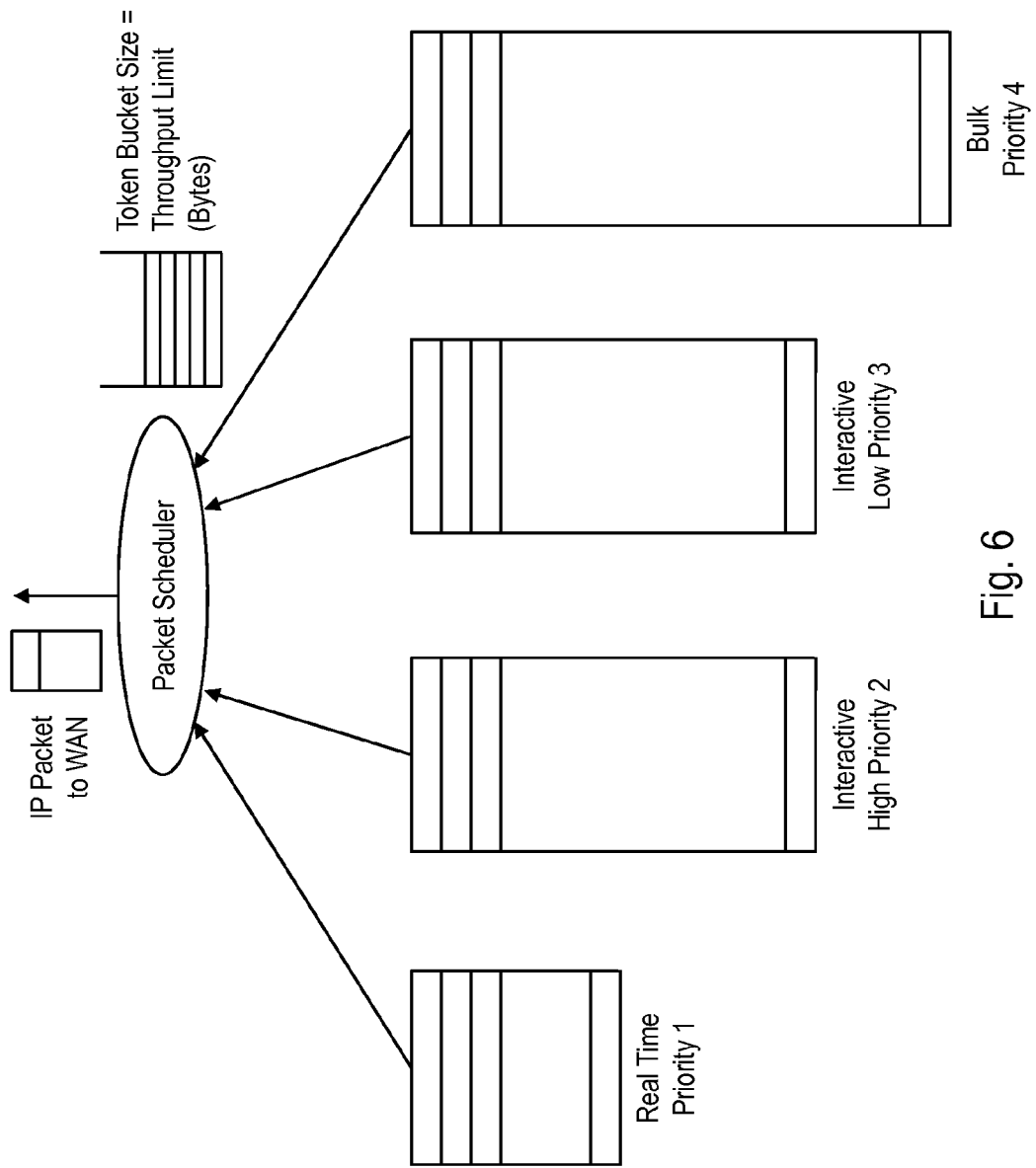
FIG. 6 is a diagram of a packet scheduler operation, in accordance with various exemplary embodiments.

As shown in FIG. 6, in various embodiments, both the VPN router 200 and the VPN gateway, using CPUs 210 and 310 respectively, implement QoS using four priority queues 601, 602, 603, and 604 for the outgoing WAN traffic, thereby classifying and prioritizing the outbound data packets. The priority queue 601 stores the highest priority packets to queue for transmission. The priority queue 602 stores the second-highest priority packets. The priority queue 603 stores the third-highest priority packets. Priority queue 604 stores the lowest priority packets. Since the VPN gateway 300 manages outgoing traffic to both VPN router 200 and VPN router 280, it maintains four priority queues for each of VPN routers 200 and 280 in the network. In the VPN router 200, priority queues 601-604 are stored in memory 220, while in VPN gateway 300, priority queues 601-604 are stored in memory 320.

FIG. 6 depicts real-time traffic, such as voice is mapped to the highest-priority queue 601. Interactive traffic such as POS and HTTP is mapped to the second-highest and third-highest priority queues 602 and 603, respectively, to match the relative priorities. Bulk traffic is mapped to the fourth and lowest-priority queue 604.

The CPUs 210 and 310 may classify an IP packet based on the fields within the packet's header (e.g., especially its Differentiated Services Code Point (DSCP) code points in QoS configurations), source and destination addresses, and, for TCP and UDP, by its source and destination ports. A variety of matching mechanisms can be employed to perform the classification including those based combinations of fields and binary masked matching and value range matching.

The CPUs 210 and 310 may classify an IP packet based on IP flows and their packet size distribution, packet time, based on deep-packet inspection of the fields within individual packets within an IP flow, and other characteristics of the IP flow.

In the various embodiments, a network manager software program that manages both the VPN router 200 and the VPN gateway 300 allows an operator to map the traffic types to the different priority queues based on individual packet header fields. The network manager software program may allow an operator to program IP selection (e.g., address, port, DSCP, etc.) based rules to map UDP traffic (such as voice). The network manager software program may be executed on the network manager apparatus 164, but alternatively can be executed on any computer or other electronic device at NOC 160 or at any remote site, as long as the device can access VPN router 200 and VPN gateway 300, either directly or indirectly, to issue the mapping.

Figure 7:
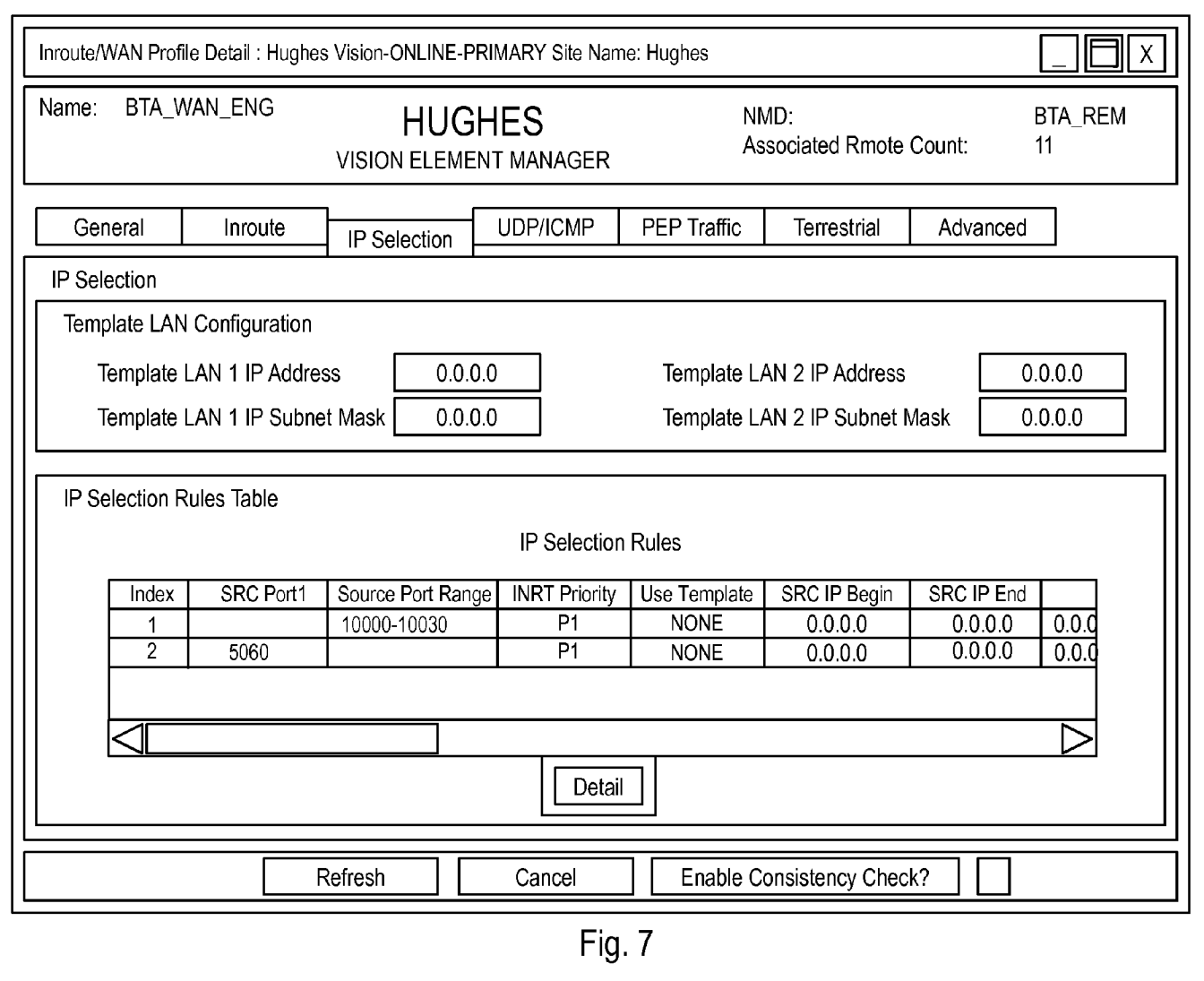

FIG. 7 depicts a sample IP selection rules configuration screen displayed on a display as a graphical user interface (GUI) for the operator. As depicted in FIG. 7, the network manager software program provides an IP Selection Rules Table section, which allows the operator to create rules for defining priority for packets. In FIG. 7, two rules have been established. The first rule maps packets having a destination port of 5060 (e.g., voice traffic) to priority queue "P1", i.e., the highest-priority queue 601. The second rule maps packets having a source port range of 10000-10030 also to priority queue "P1".

The network manager software program may also allow an operator to classify a TCP connection's traffic based on TCP Performance Enhancement Proxy (PEP) rules. In particular, an operator may classify such traffic based on a SYN packet's header fields, with the result being to map TCP connections to backbone connections where each backbone connection operates at a different priority level. The result can be to map different TCP connections carrying different types of traffic (HTTP, FTP, etc.) to a different priority level. For example, HTTP traffic may be mapped to a lower priority backbone connection, while POS traffic may be mapped to a higher priority backbone connection.

FIG. 8 depicts a GUI that includes a sample screen displayed on the display as a GUI for the operator for such a classification of TCP connections. As depicted in FIG. 8, the screen includes a Selection Rules section, which allows the operator to create rules for a PEP Spoofing Selection Rule List. In the list in FIG. 8, there are three rules. In each of the rules, various spoofing options and parameters can be set, along with the TCP port list for the rule.

Once the CPUs 210 and 310 establish the respective packet traffic classification and prioritization mappings, the next step is to have packet scheduler modules 230 and 360, in VPN router 200 and VPN gateway 300 respectively, process the packets from their respective WAN queues and shape the traffic as per a prioritization scheme. That is, both packet scheduler modules 230 and 360 process the outgoing IP packets in their respective WAN queues, which are filled according to the traffic classification and prioritization rules.

In the certain embodiments, each packet scheduler module 230 and 360 implements a token bucket 610 with a maximum bucket size in bytes corresponding to the respective throughput limit. That is, the token bucket 610 of packet scheduler 230 has a maximum bucket size of the uplink throughput limit. The token bucket 610 of packet scheduler 360 has a maximum bucket size of the downlink throughput limit. In the VPN router 200, the token bucket 610 is stored in memory 220, while in the VPN gateway 300, the token bucket 610 is stored in memory 320.

The packet scheduler modules 230 and 360 then each process the packets from the WAN queues in a strict priority order, thereby ensuring that the real-time traffic is always processed with the least amount of queuing delay. While processing packets, the packet scheduler modules 230 and 360 include (i.e., take into account) the underlying network protocol overhead (on top of the IP packet length) in its available tokens calculations prior to dequeuing a packet from a WAN queue for transmission.

Essentially, each packet scheduler module sets up a token bucket with the maximum number of tokens corresponding to the throughput limit. That is, the maximum number of tokens for token bucket of packet scheduler module 230 corresponds to the uplink throughput limit on VPN router 200. The maximum number of tokens for each (i.e., per-site) token bucket of packet scheduler module 360 corresponds to the per-site downstream throughput limit on VPN gateway 300.

Each packet scheduler inspects the queues in the order of their priority to see if any packets are available for transmission. If a packet is available, the packet scheduler checks to see if enough tokens (in bytes) are available to cover the packet size and the associated network protocol overhead.

Each packet scheduler determines the network protocol overhead based on the WAN protocol and ATM encapsulation mode configured on the transport device attached to the VPN router (e.g., DSL modem 122 attached to VPN router 200, for packet scheduler module 230). This information may be obtained according to one of the procedures explained later with respect to FIG. 9. If this information is not available, a worst case scenario of IPSec with PPPoE over AAL5 (see FIG. 4) is assumed for the overhead calculation. Each packet scheduler module 230 and 360 dequeues and transmits a packet only if enough number of tokens is available to satisfy the transmission request.

In various embodiments, traffic shaping is based on strict priority queuing. In various other embodiments, the packet scheduler modules 230 and 360 may alternatively utilize other priority schemes such as Weighted Fair Queuing to provide a suitable QOS policy for various situations.

Once the traffic classification, prioritization, and shaping is established, all that remains to be configured is the correct throughput limit (token bucket size) at each VPN peer, to match the last-mile link speeds and take into account the appropriate network protocol overhead in the throughput limit calculations and enforcement.

However, to configure optimal uplink and downlink throughput on last-mile link 121, the VPN router 200 needs to recognize the various link characteristics information (i.e., configuration) from DSL modem 122. The link characteristics information includes, e.g., uplink speed, downlink speed, WAN Protocol (e.g., RFC 2684 Bridged, RFC 2684 Routed, PPPoA, PPPoE, etc.), and ATM Encapsulation Mode (e.g., LLC, VC MUX, etc.)

Initial Configuration of VPN Router 200 and VPN Gateway 300

Figure 9:
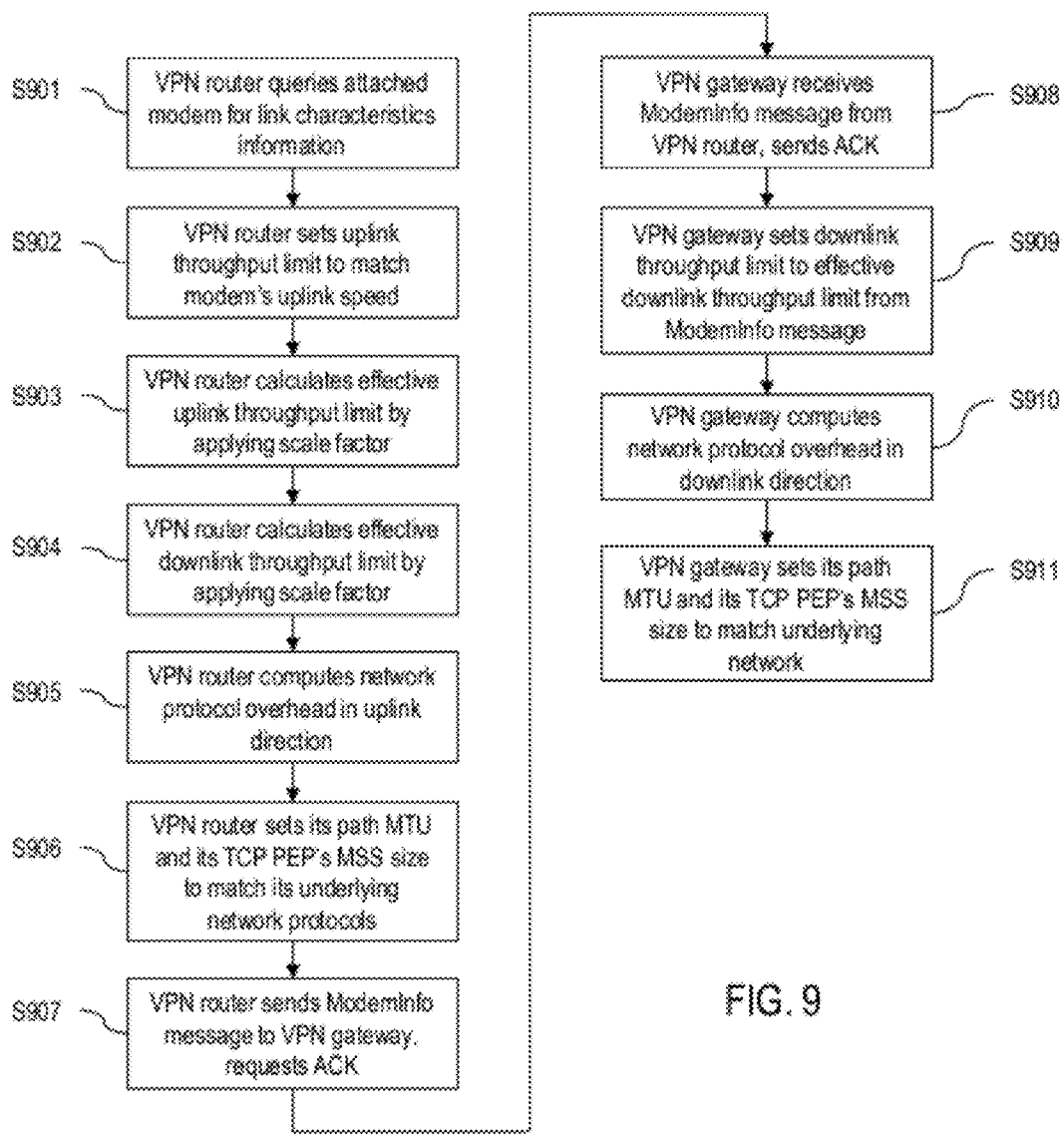
FIG. 9 is a flowchart of a process for adjusting network throughput limits, path Maximum Transmission Unit (MTU) sizes, and Transmission Control Protocol (TCP) Packet Exchange Protocol's (PCP) Maximum Segment Size (MSS) sizes, based on the last-mile link speed and the network protocol overhead, in accordance with various exemplary embodiments.

FIG. 9 depicts steps for the VPN router 200 to recognize the various link characteristics information (i.e., configuration) from DSL modem 122, allowing VPN router 200 and VPN gateway 300 to adjust network throughput limits, path MTU sizes, and TCP PEPs MSS, based on the last-mile link speed and the network protocol overhead. It will be understood that unless otherwise stated, operations performed by VPN router 200 or VPN gateway 300 are performed using the respective control modules stored in the memory of each.

In step S901, the VPN router 200 queries DSL modem 122 for information pertaining to its link characteristics, such as, e.g., the WAN protocol, ATM encapsulation mode, and uplink/downlink speeds. VPN router 200 may perform this query according to one of the following methods.

First, the VPN router 200 may use SNMP to obtain the information from DSL modem 122. If the VPN router 200 is aware of the manufacturer and model of DSL modem 122, the VPN router 200 can acquire the SNMP data using the known SNMP variables for DSL modem 122.

Since the make and model of the installed modem could vary from site to site, however, a complexity exists in identifying DSL modem 122 attached to VPN router 200, along with the SNMP Object Identifiers (OIDs) to be used for DSL modem 122. Accordingly, the VPN router 200 may incorporate an auto-detection mechanism to identify DSL modem 122 and the SNMP OIDs to poll for DSL modem 122. This auto-detection mechanism may include a Component-Off-The-Shelf (COTS) Devices Monitoring Based on Device Auto-Detection mechanism. This approach provides a SNMP based simple, generic, and flexible mechanism to poll VPN router's 200 modem's status and statistics irrespective of the type of device and display only those statistics that are of interest for that device, to an operator at the NOC. The VPN router 200 auto-detects the transport device (e.g., DSL modem 122) provided it is one of the known devices in the network and polls the SNMP variables configured for that device.

According to various embodiments, the auto-detection approach operates as follows. First, the VPN router's 200 SNMP Management Information Base (MIB) table, in SNMP storage 222 within memory 220, is enhanced to define a new a Transport Device Statistics (TDS) MIB table. Each entry in the TDS MIB table contains a generic TDS name, TDS OID, and TDS value. In NOC 160, an operator operates the network manager apparatus 164 which contains a network manager module, in certain embodiments, in software. The network manager module configures each VPN router in system 100 with: (1) a list of all the transport device names deployed or deployable in the network; (2) a table of operator-configured (TDS Name, TDS OID) values to monitor for each of the transport devices; and (3) a monitoring interval for each device. The VPN router 200 proceeds to auto-detect the device (e.g., DSL modem 122) by querying its modem's name to find a match in its list of configured transport device names; the configuration is ignored if a match is not found. If a match is found, the VPN router 200 polls the SNMP variables specified for its device periodically as per the specified monitoring interval and stores the statistics locally, in SNMP storage 222 within memory 220. To query the modem name, the VPN router 200 may request the SNMP sysDescr variable from DSL modem 122. If the DSL modem 122 supports SNMP, the VPN router's 200 request for data corresponding a SNMP sysDescr variable will return the device name of DSL modem 122. The SNMP sysDescr variable is global to SNMP devices. Once the DSL modem 122 is identified, the VPN router 200 polls various SNMP variables including, in accordance with the present invention, the WAN protocol, ATM encapsulation mode, and uplink/downlink speeds.

When a transport device status/statistics update is required, the network manager at NOC 160 issues an SNMP query to VPN router 200 for the Transport Device Statistics MIB table. Upon receiving the SNMP query, VPN router 200 populates the Transport Device Statistics MIB table with a snapshot of the local contents in SNMP storage 222 and provides the snapshot in its SNMP response. The network manager at NOC 160 displays (e.g., on a display screen) the results (i.e., snapshot of TDS MIB table) of the SNMP response in the form of a table with each entry displaying (TDS Name, TDS OID, TDS Value) thereby displaying only those statistics that are of interest to the operator for the given transport device.

If SNMP or device auto-detection features cannot be used (e.g., if DSL modem 122 does not support SNMP), other techniques may be used to obtain the link characteristics information.

For instance, the VPN router 200 may use periodic HTML scraping of DSL modem's 122 web pages in case the status/statistics are not easily accessible via SNMP or DSL modem 122 does not support SNMP. VPN router 200 receives information relating to the DSL modem's 122 URL, HTML tags, etc., by an installer at the time of VPN router's 200 installation at remote site 120. VPN router 200 may also accomplish the periodic HTML scraping in a two-stage process, where initial scraping is used to identify the device type of DSL modem 122, which then guides the further scraping of specific device characteristics of DSL modem 122.

Alternatively, VPN router 200 may obtain the information via telnet, SSH, TR-069, etc. Yet another alternative is to provide a static configuration on VPN router 200, if the link characteristics information cannot be obtained from DSL modem 122. In a case that the link characteristics are not available by any means, VPN router 200 and VPN gateway 300 use NOC-configured default throughput limits in the uplink and downlink direction, respectively, and use a default network configuration of PPPoE with LLC encapsulation mode for overhead calculations.

As depicted in FIG. 1, the remote site 120, DSL modem 122 will provide link characteristics information which includes, e.g., a downlink speed of 1.5 Mbps and an uplink speed of 384 Kbps.

Once the link characteristics information is obtained, it is stored in memory 220 and is made available to the various applications and/or modules within VPN router 200.

In step S902, VPN router 200 sets its uplink throughput limit in the uplink direction to match the DSL modem's 122 uplink speed learned from step S901. That is, in the example of FIG. 1, VPN router 200 sets its uplink throughput limit to 384 Kbps.

In step S903, VPN router 200 applies a configurable throughput scale factor to the modem uplink throughput limit. The scale factor ensures that the maximum uplink throughput does not exceed DSL modem's 122 uplink speed. That is, the intent of the uplink scale factor is to keep the overall link throughput slightly below DSL modem's 122 uplink line speed, to account for small traffic bursts and to prevent overdriving last-mile link 121 in the uplink direction.

In certain embodiments, the default scale factor is set at 90%. Thus, the Effective Uplink Throughput Limit equals (Modem-provided uplink speed)*(Uplink Throughput Limit Factor).

Accordingly in remote site 120, the Effective Uplink Throughput Limit=384 Kbps*90%=345.6 Kbps, which may be rounded down to 345 Kbps. Thus, VPN router 200 sets its uplink throughput limit at 345 Kbps.

In step S904, VPN router 200 applies a configurable throughput scale factor to the modem downlink throughput limit. The scale factor ensures that the maximum downlink throughput by VPN gateway 300 does not exceed DSL modem's 122 downlink speed. Similar to the uplink scale factor, the intent of the downlink scale factor is to keep the overall link throughput slightly below DSL modem's 122 downlink line speed, to account for small traffic bursts and to prevent overdriving last-mile link 121 in the downlink direction. The downlink scale factor may be the same as, or different from, the uplink scale factor.

According to various embodiments, the default scale factor is set at 90%. Thus, the Downlink Effective Throughput Limit equals (Modem-provided downlink speed)*(Downlink Throughput Limit Factor).

Accordingly in remote site 120, the Effective Downlink Throughput Limit=1.5 Mbps*90%=1.35 Mbps. Thus, VPN router 200 sets the effective downlink throughput limit at 1.35 Mbps.

While VPN router 200 does not directly utilize the effective downlink throughput limit to throttle transmissions, VPN gateway 300 incorporates the effective downlink throughput limit for its downlink transmissions from NOC 160 to remote site 120, as will be described later.

Thus, VPN router 200 obeys the effective uplink throughput limit (i.e., the token bucket size for packet scheduler module 230) in the uplink direction.

In step S905, VPN router 200, using packet scheduler module 230, uses the WAN protocol and ATM encapsulation information to compute the network protocol overhead (e.g., IPSec, PPP, ATM, etc.) associated with the underlying network in its throughput calculations, such as shown in the examples of FIGS. 4 and 5. For instance, in FIG. 4, the IP packet incurs an overhead of 38 bytes, the IPSec encapsulation incurs an overhead of 70 bytes, the PPoE frame incurs an overhead of 26 bytes, the LLC incurs an overhead of 10 bytes, and AAL-5 incurs an overhead of 32 bytes. Accordingly, the total overhead is 176 bytes.

In step S906, VPN router 200 uses the computer network protocol overhead to set its path MTU and its TCP MSS to match the underlying network between NOC 160 and remote site 120. That is, the VPN router's 200 path MTU and TCP MSS for packets sent from VPN router 200 to VPN gateway 300 are dependent upon at least the overhead associated with the WAN protocol and ATM encapsulation information. According to an exemplary embodiment, an MSS for a TCP connection is negotiated during connection establishment. The TCP SYN packet and the TCP SYNACK packet carry an MSS TCP header option, which provides the maximum segment size that the sender is prepared to receive. The VPN router enforces a preferred MSS value by reducing the value found in the MSS header option of a TCP SYN packet and of a TCP SYNACK packet to be no larger than the preferred value for packets going to the sender and adjusts the checksums accordingly. This is done either as part of a TCP spoofing PEP optimization, or on un-spoofed TCP connections where only the TCP SYN and TPC SYNACK packets are edited.

In step S907, VPN router 200 sends a "ModemInfo" message to VPN gateway 300. The ModemInfo message includes the link characteristics information that VPN router 200 learned from DSL modem 122 in step S901, including, e.g., the modem-provided and the effective uplink and downlink speeds, WAN protocol, and ATM encapsulation modem, along with other information such as, e.g., modem type (DSL, wireless, cable, etc.).

Figure 10:
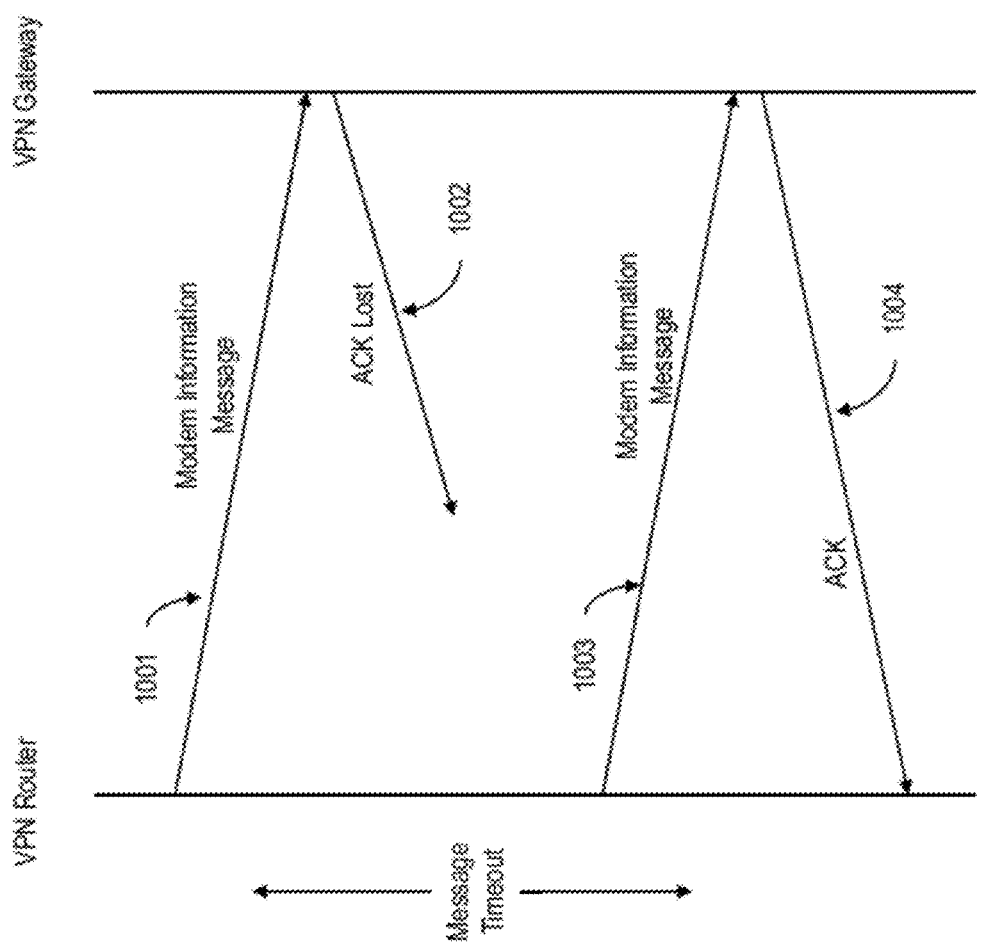
FIG. 10 is a diagram depicting the transmission and acknowledgement of a ModemInfo message, in accordance with various exemplary embodiments.

FIG. 10 depicts transmissions relating to the ModemInfo message. Transmission 1001 contains a ModemInfo message sent from VPN router 200 to VPN gateway 300. Transmission 1002 contains an acknowledgement to transmission 1001, sent by VPN gateway 300 to VPN router 200. Transmission 1003 is a re-transmission containing the ModemInfo message, from VPN router 200 to VPN gateway 300. Transmission 1004 contains an acknowledgment to transmission 1003, sent by VPN gateway 300 to VPN router 200.

As depicted, the VPN router 200 sends transmission 1001 (hereinafter simply referred to as "ModemInfo message") to VPN gateway 300. The ModemInfo message 1001 can be piggy-backed as a new "ModemInfo" option on any of the existing messages already exchanged between VPN router 200 and VPN gateway 300. Alternatively, an application can be provided at each end to send and receive this message at their respective ends using UDP, TCP, HTTP or some other application-level transport. In certain embodiments, the VPN router 200 uses UDP in a client-server mode with VPN gateway 300 as the server.

In various embodiments, the VPN router 200 also sets an "acknowledgement (ACK) requested" flag in ModemInfo message 1001 in order to ensure that VPN gateway 300 acknowledges receipt of ModemInfo message 1001. Thus, the VPN gateway 300, upon receiving ModemInfo message 1001, sends an ACK message 1002 back to VPN router 200 to confirm receipt of ModemInfo message 1001. As depicted in FIG. 7, in various embodiments, the ACK message 1002 is lost, and is not received by VPN router 200. Accordingly, after a timeout period of not receiving an ACK message, the VPN router 200 retransmits the ModemInfo message, here as re-transmission 1003. The VPN gateway 300, upon receiving re-transmitted ModemInfo message 1003, sends an ACK message 1004, which this time is received by VPN router 200. Thus, the VPN router 200 ensures that VPN gateway 300 has received the ModemInfo message.

The ModemInfo message may also contain other information such as, e.g., the modem name and type, which NOC 160 may be use for billing purposes and/or to provide a network view of the different types of modems connected to VPN gateway 300.

In step S908, the VPN gateway 300 receives ModemInfo message and, if the ACK-requested flag is set, sends an ACK message back to VPN router 200 in accordance with the transmissions of FIG. 10.

In step S909, the VPN gateway 300 sets its downlink throughput limit for remote site 120, in accordance with the effective downlink throughput limit calculated by VPN router 200 in step S904. That is, in various embodiments, the VPN gateway sets its downlink throughput limit for remote site 120 to 1.35 Mbps. Alternatively, the VPN gateway 300 may re-calculate an effective downlink throughput limit based on the DSL modem 122 link characteristics information that it extracts from the ModemInfo message.

According to various embodiments, the VPN gateway 300 sets the per-site throughput limit for VPN router 200 (i.e., the token bucket size for packet scheduler module 360) according to a minimum of: (1) the effective downlink throughput limit; and (2) a NOC-configured maximum downlink throughput limit. In cases where DSL modem speeds are much greater than the throughput available at NOC 160, the NOC-configured limit restricts the downlink throughput limit to meet the NOC 160 service plan offering.

In step S910, the VPN gateway 300, using packet scheduler module 360, uses the WAN protocol and ATM encapsulation information to compute the network protocol overhead (e.g., IPSec, PPP, ATM, etc.) associated with the underlying network in its throughput calculations. Alternatively, the overhead information may be transmitted in the ModemInfo message in accordance with the computation by VPN router 200 in step S905.

In step S911, the VPN gateway 300 uses the computed overhead to set its path MTU and its TCP PEPs MSS to match the underlying network between NOC 160 and remote site 120. That is, the VPN gateway's 300 path MTU and TCP PEPs MSS for packets sent to VPN router 200 are dependent upon at least the overhead associated with the WAN protocol and ATM encapsulation information.

Additionally, variables other than, or in addition to, the path MTU and TCP PEPs MSS can be adjusted based on the monitored throughput, depending on, e.g., the particular network protocol(s) employed.

Additionally, it is appreciated that the steps of FIG. 9 may be applied to last-mile link 141 of remote site 140 or any other last-mile links in systems similar to that of system 100.

Figure 11:
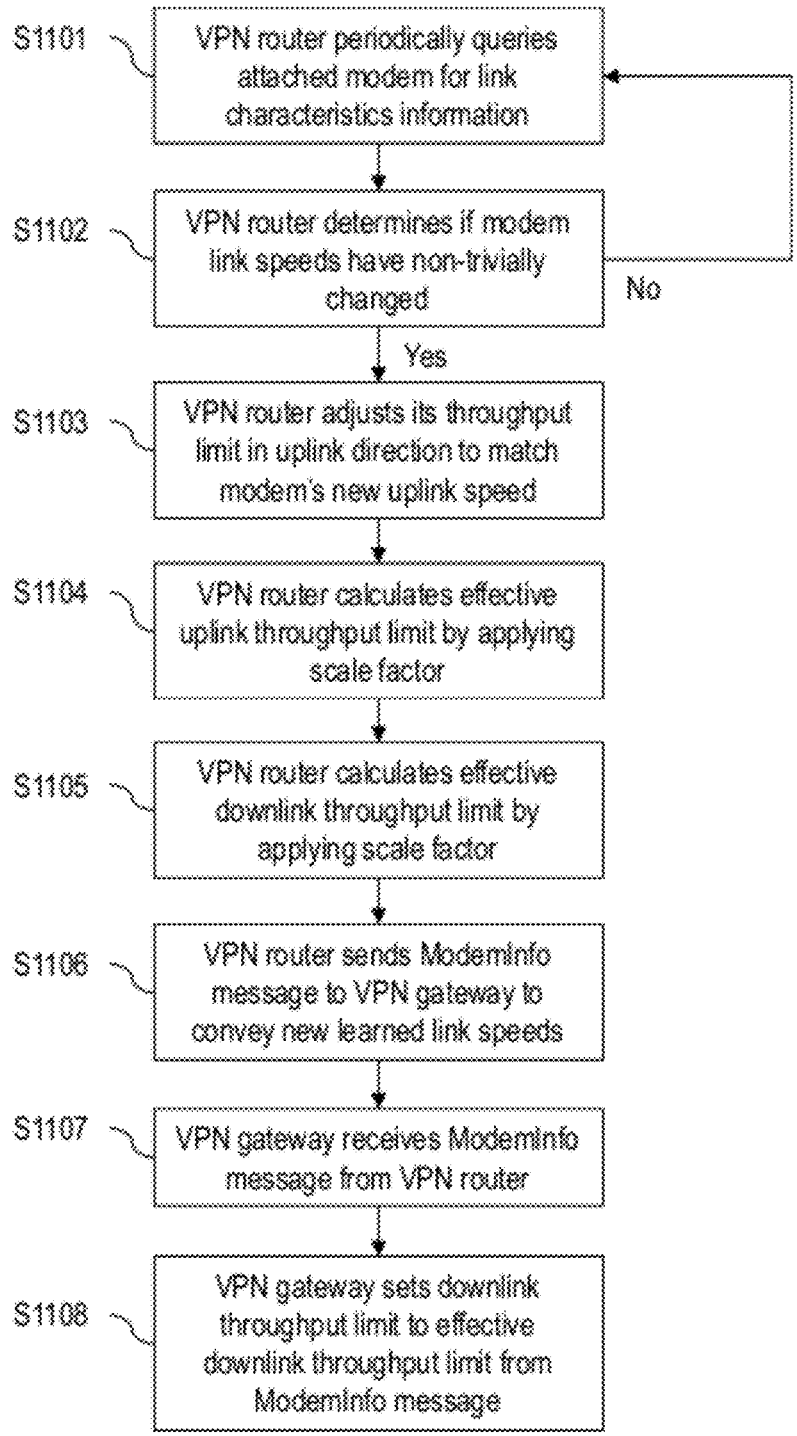
FIG. 11 is a flowchart of a process for adjusting network throughput limits, based on a monitored change in the last-mile link speed, in accordance with various exemplary embodiments.

Periodic Re-configuration of VPN Router 200 and VPN Gateway 300 Upon Change in Modem Characteristics FIG. 11 depicts steps for VPN router 200 and VPN gateway 300 to adjust network throughput limits, based on a monitored change in the last-mile link speed.

Such a change may result from a retraining of the modem by the DSLAM in NAP network 105. Modems can retrain for at least two main reasons: (1) variations in the signal-to-noise ratio; or (2) if large numbers of errors are detected. When this occurs, the DSLAM in NAP network 105 and the DSL modem 122 renegotiate the line speeds.

Another such change may result from remote site 120 changing its DSL service plan to a higher (i.e., greater throughput) or lower (i.e., less throughput) tier of service.

These changes necessitate an updating of the uplink and downlink throughput limits on VPN router 200 and VPN gateway 300, respectively, in order to maintain optimal data throughput. That is, by updating the throughput limits, system 100 prevents the over-driving of last-mile link 121 (e.g., when the modem link speed decreases) or the under-utilizing the last-mile link 121 (e.g., when the modem link speed increases).

It will be understood that unless otherwise stated, operations performed by VPN router 200 or VPN gateway 300 are performed using the respective control modules stored in the memory of each.

In step S1101, the VPN router 200 periodically queries DSL modem 122 for link characteristics information, using the same approach as that in step S901.

In step S1102, the VPN router 200 determines if the returned link speed information from the query in step S1101 has changed compared to the previous link speed information. In various embodiments, a positive determination is made only when the change in link speed is non-trivial (e.g., changed beyond a configurable limit), to avoid unnecessary computations and ModemInfo messages.

In step S1102, if modem link speeds have non-trivially changed compared to previous values, then the process moves to step S1103. In that case, the new link speed information includes a new uplink throughput limit and a new downlink throughput limit. Depending on circumstances, one of the two throughput limits may remain unchanged, or both may be changed, compared to previous values.

Otherwise, if the modem link speeds have not changed (or if the change is merely trivial), the process moves back to step S1101 to continue periodically monitoring DSL modem 122 link characteristics information.

In step S1103, the VPN router 200 sets its uplink throughput limit in the uplink direction to match the DSL modem's uplink speed learned from step S1101, similar to step S902.

In step S1104, the VPN router 200 applies a configurable throughput scale factor to the new modem uplink throughput limit, to obtain the effective uplink throughput limit, similar to step S903. As previously noted, the effective uplink throughput limits ensure that the maximum uplink throughput does not exceed DSL modem's 122 uplink speed, providing consideration for small traffic bursts.

In step S1105, the VPN router 200 applies a configurable throughput scale factor to the new modem downlink throughput limit, to obtain the effective downlink throughput limit, similar to step S904.

In step S1106, the VPN router 200 sends a ModemInfo message to VPN gateway 300. Similar to step S907, the ModemInfo message contains at least the new effective uplink and downlink throughput limits. As in step S907, ModemInfo message may contain other data including, e.g., the new modem-provided uplink and downlink throughput limits, and may be sent by being piggy-backed on an existing message.

In step S1107, the VPN gateway 300 receives the ModemInfo message from VPN router 200, similar to step S908. As in steps S907 and S908, the VPN router 200 may set an ACK-requested flag to confirm receipt of the ModemInfo message.

In step S1108, the VPN gateway 300 sets its new downlink throughput limit for remote site 120, in accordance with the effective downlink throughput limit calculated by the VPN router 200 in step S1105 and contained in the ModemInfo message.

It will be appreciated that the steps of FIG. 11 may be used to update the throughput limits for last-mile link 141 of remote site 140, and can be extended to updating any other last-mile links in systems similar to that of system 100.

By performing the steps of FIGS. 9 and 11, the system 100 allows VPN peers (e.g., VPN router 200, VPN gateway 300, etc.) to provide QoS to the end-user traffic while reacting to the changing network conditions by (1) actively monitoring the modem link speeds and automatically adjusting the Throughput Limit settings in both directions; and (2) actively monitoring the traffic and scaling back the bulk and interactive traffic automatically to give priority to the real-time and interactive traffic.

While the operation of system 100 will be improved by the process described above, network performance may be even more greatly improved by incorporating a TCP Performance Enhancing Proxy (PEP) that has been optimized with an enhanced backbone protocol (TBP), in comparison to the use of standard TCP. The details of such a TCP PEP is described below.

Terrestrial Broadband Optimized TCP Performance Enhancing Proxy (PEP)

This section provides the details of the system and method to guarantee QoS in dedicated local loop networks. Both the VPN Router and the VPN Gateway implement TCP Performance Enhancing Proxy (TCP PEP) which has been optimized for use in the present invention. The enhancements include the use of an enhanced backbone protocol, referred to as the Terrestrial-Broadband Backbone Protocol (TBP) used by the Hughes Network Systems TCP Protocol Enhancing Proxy (PEP) mechanism to carry TCP traffic across a terrestrial broadband network in an optimized fashion. The optimized PEP offers several advantages over native TCP in a terrestrial broadband setting including:

(1) Consistent, High Bulk-Transfer Throughput: TBP uses the available network capacity more efficiently providing bulk data transfer throughput that is typically 90% of the available capacity. Unlike native TCP, TBP's throughput does not vary as much over time as it does not overload buffers to the point of packet loss and does not respond to packet loss with sharp reductions in transmit rate.

(2) Higher Availability Through Higher Packet-Loss Tolerance: While native TCP's performance severely degrades in the presence of significant packet loss, TBP provides excellent throughput and response time even in the presence of packet loss exceeding 10%. TBP thus provides higher availability by allowing effective communications across networks which would otherwise be effectively "down" with native TCP.

(3) Bandwidth Reduction: TBP supports stateful V.44 compression which provides excellent bandwidth reduction (e.g., 4 to 1 or higher) when carrying compressible data. By providing a persistent, loss-less, in-sequence transport for multiple TCP connection's traffic, TBP provides a transport on which stateful compression can be used where the compression of a new TCP connection may benefit from the history of having carried previous TCP connection traffic.

(4) Bulk Transfer Throughput Measurement: TBP identifies bulk data transfers and measures their throughput providing management visibility into this important application-level performance characteristic.

(5) Accurate Packet Loss Measurement: TBP identifies not only packet retransmission, but also accurately measures actual packet loss (without triggering packet loss itself by overflowing buffers) thereby providing management visibility into this important network performance characteristic.

TBP automatically measures and adjusts to varying network capacity, latency and jitter providing its performance gains across such DSL, EVDO, T1 and other networks. No parameter tuning is required to achieve TBP performance improvements specific to the network in question. The enhanced TCP PEP also provides for the spoofing of MSS negotiation thereby allowing the maximum sized TCP packet to be appropriately sized to allow efficient transport by the underlying network. Unless stated otherwise, the TBP is performed by VPN router 200 (and/or VPN router 280) and VPN gateway 300 in the system 100, according to software which is executed on CPUs 210 and 310, respectively, and is stored on in memories 220 and 320, respectively. However, it will be appreciated that TBP could alternatively be constructed as hardware components or a combination of hardware and software components.

2. TBP Packet Loss Recovery:

The Terrestrial Backbone Protocol (TBP) is an enhanced ARQ type protocol which includes:

(1) Each transmitted packet has an incrementing sequence number (like HDLC and unlike TCP which utilizes a byte count sequence number).

(2) Timer-based Ack transmission—ACKs (and SACKs) are sent after a fixed number of milliseconds since the first unacked packet reception. This provides a short upper bound on when an ack should be expected by the sender while minimizing the number of ack packets the underlying protocol must carry.

(3) Selective Ack (SACK) optimized packet loss recovery wherein SACK packets are returned when they are outof-sequence packets. The SACK packets, using ranges of packet sequence numbers, identify which packets have been received.

(4) Fast retransmit go-back-n mechanism where, when few packets are unacknowledged, the packets are retransmitted as soon as the measured round-trip latency indicates that they should have been acknowledged. Because this is performed for only a few packets the load increase on the underlying network is not significant and packet loss is recovered much more quickly than TCP which has a retransmission policy that utilizes a longer retransmit timeout.

(5) A Poll-transaction mechanism is used wherein a poll packet is sent after a timeout which is little longer than the measured round-trip time. The Poll packet (and its response) are small packets which do not noticeable increase network loading and so may be sent as soon as there is the suspicion that packet retransmission may be necessary. The response to a poll packet may be a poll response packet carrying the acknowledgement information for all acked packets (in ACK packet or SACK packet format). The receipt of a poll response allows the receiver to reliably assess which packets sent prior to the poll request need to be retransmitted.

The combination of these features results in a backbone protocol that quickly and efficiently responds to lost packets, providing improved performance in the face of packet loss for both situations that have an on-going transfer of packets (e.g., bulk transfer) and for those involving intermittent packet transaction (e.g., when carrying intermittent transactions).

The following describes how to implement a backbone protocol providing the features of TBP. It includes sections on how packet loss is accurately measured and how bulk throughput is accurately measured. Other ARQ protocol variations (selective repeat, selective reject, each with various variations) may be used to provide higher than TCP performance in the presence of packet loss and these variations could be used in an alternative embodiments of the present invention.

2.1. TBP Packet Header:

This section introduces the TBP packet header and provides a brief introduction into each of the different TBP packet types. How the various packets may be used is detailed later herein.

2.1.1. TBP Packet Header

Figure 12:
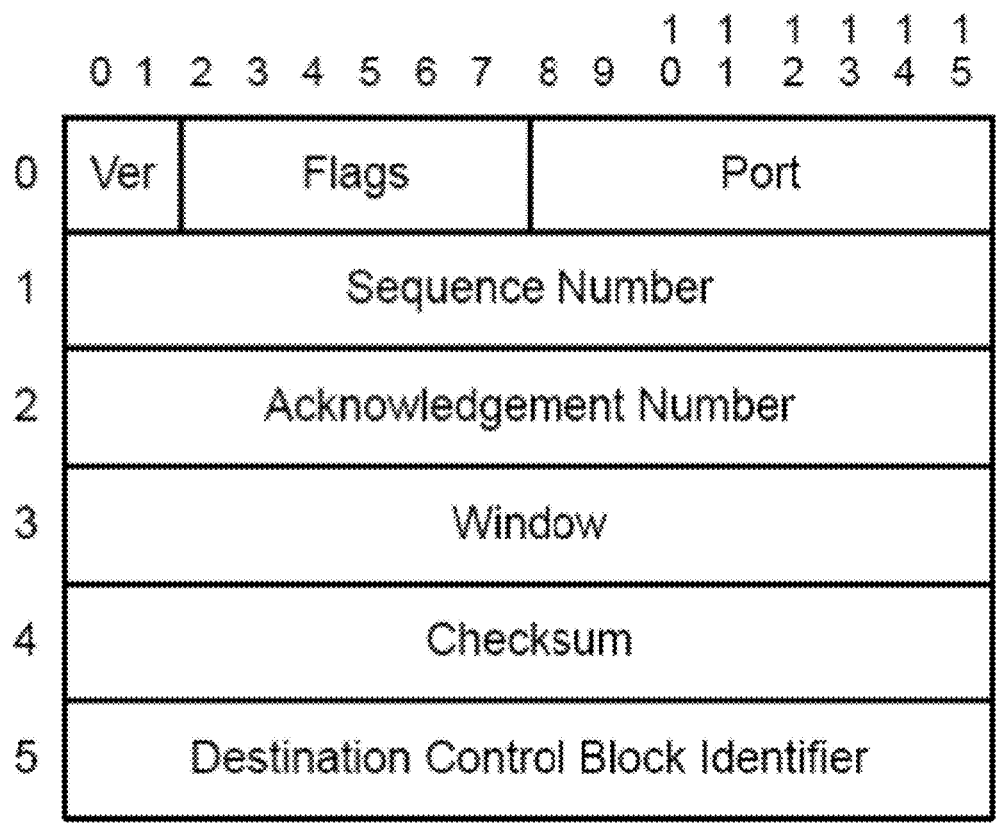
FIG. 12 is a diagram depicting a Terrestrial Backbone Protocol (TBP) packet header format, in accordance with various exemplary embodiments.

FIG. 12 depicts the general 12-byte TBP packet header format, wherein 0 to 15 at the top of the figure represent bits. An introduction to each of the fields is as follows:

(1) Ver—the version number field. TBP packets have a version of 0x3.

(2) Flags—the Flags field (together with the Ver field) identifies the kind of packet being carried. Each bit within the Flags field has a name, as follows:

```
#define FLAG_SACK      0 x 20
#define FLAG_ACK       0 x 10
#define FLAG_SS        0 x 08
#define FLAG_POLL      0 x 04
#define FLAG_RST       0 x 02
#define FLAG_SYN       0 x 01
```

A given packet (e.g. SYN packet) is identified by a combination of these bits.

(3) Port—Identifies a connection from configuration parameters.

(4) Sequence Number—the sequence number field uniquely identifies the contents of that packet. For data packets it increments with each new block of data submitted by TBP's client for transmission. In other packets it may hold other values.

(5) Acknowledgement Number—holds the sequence number of the next in-sequence DATA packet expected by the sender of a packet.

(6) Window—operates as a receive window. The window field signifies the amount of buffer space, in packets, available to the sender of a packet, to receive data packets from the Acknowledgement Number and beyond. TBP uses bits 0 through 9 to hold the window size (in packets). The value 0x3FF is reserved, indicating "0x3FF or more packets." The remaining bits may be used as follows:

(6)(a) Bit 15—is set when a data packet is being retransmitted. This clear identification of retransmitted packets facilitates the tracking of truly lost packets.

(6)(b) Bits 13 and 14—hold the least two significant bits of the senders count of lost packets. This allows a TBP node to keep its peer informed on packet loss rate being experienced by packets sent by the peer.

(6)(c) Bit 12—is set when a data packet is being transmitted and there is a backlog of additional data packets awaiting transmission. This bit can be used by the receiver of the packet to discern bulk transfers.

(6)(d) Bits 10 and 11—reserved for future use and set to zero until then.

(7) Checksum—reserved for future use.

(8) Destination Control Block Identifier—uniquely identifies a connection in a fashion that is convenient for the receiver of the packet.

A receiver infers the length of a TBP packet from the length field of whatever lower-level protocol (e.g., IP) that is carrying the TBP packet.

2.1.2. TBP SYN Packet Header:

A SYN packet's Flags field has just the FLAG SYN bit set. The first byte of data holds the value the sender expects to receive in subsequent packet's Destination Control Block Identifier fields. The sequence number field establishes the sequence number the peer should expect for the first data packet. The Acknowledgement Number field holds the sequence number of the next in sequence packet expected by the sender of a packet.

2.1.3. TBP SYNACK Packet Header:

Identical to a SYN packet except that the Flags field also has the FLAG_ACK bit set.

2.1.4. TBP ACK Packet Header:

The Flags field holds all zeroes. The inferred length of the packet covers only the TBP header. The window field's lost packet count bits are accurately set. The window field's retransmission bit is clear. The Acknowledgement Number field holds the sequence number of the next insequence packet expected by the sender of a packet.

2.1.5. TBP DATA Packet Header:

The Flags field typically holds all zeroes. When an immediate acknowledgement of the packet is desired (for round-trip measurement purposes), the Flag's FLAG_ACK bit is set. The inferred length of the packet covers the TBP header and the number of bytes being carried. The window field's lost packet count, backlog and retransmission bits are accurately set. The Acknowledgement Number field holds the sequence number of the next insequence packet expected by the sender of a packet.

2.1.6. TBP SACK Data Packet Header:

The Flags field has the FLAG_SACK and FLAG_ACK bits set. In addition to the TBP header, a SACK packet holds one or more SACK blocks. The Acknowledgement Number field holds the sequence number of the next insequence packet expected by the sender of a packet. A SACK block acknowledges a range of packets or a single packet. It consists of two sequence numbers:

(1) Left Edge—holds the "lowest" sequence number of the range of packets acknowledged by the SACK block.
(2) Right Edge—holds the "highest" sequence number of the range of packets acknowledged by the SACK block.

2.1.7. TBP TBP Poll Request Packet Header:

The Flags field has the FLAG_POLL bit set. A TBP Poll Request packet's Acknowledgement Number field holds a poll sequence number. The poll sequence number is incremented with each poll transmission and uniquely identifies a poll request. The poll sequence number exists to allow a Poll Response packet to positively identify which poll it is being sent in response to. This assists the determination of which data packets need to be retransmitted upon the completion of a TBP poll transaction. A TBP Poll Request packet's Sequence Number field holds the sequence number of the next data packet to be sent by this end of the link. That is, the sequence number field is one greater than the sequence number of the highest data packet already sent. A TBP Poll request packet does not carry SACK blocks.

2.1.8. TBP TBP Poll Response Packet Header:

The Flags field has the FLAG_POLL and FLAG_ACK bits set. When the TBP Poll Response carries one or more SACK blocks it also has the FLAG_SACK bit set. A TBP Poll Response packet's Sequence Number field holds the value of the poll sequence number of the TBP Poll Request packet which triggered the TBP Poll Response packet's transmission. A TBP Poll Response packet's Acknowledge Number field and Window field hold the same values they would hold if the packet were an ACK packet. An RPB Poll Response packet has SACK blocks (like a SACK packet) as needed to accurately conveyed the set of out-of-sequence packets the sender of the TBP Poll Response packet has already received.

2.2. DATA Packet Transmission:

A data packet is assigned its sequence number when it is submitted for transmission by TBP's client. Apart from retransmissions, data packets are sent in sequence. A data packet is sent as soon as permitted by all of the following:

(1) Receive Window—a data packet is only sent when the peer has signaled that it has a buffer to hold the received packet.
(2) Transmit Window—TBP controls its flow of transmissions by limiting the amount of unacknowledged data it may have outstanding. The TBP window size is primarily in bytes although TBP always allows at least TBP_MIN_TX_WIND (a compile-time value of 3) packets outstanding. This minimum number of packet outstanding allows even low-speed links to be saturated (providing high bulk transfer efficiency) even when those links would have a small in byte-terms window size. The window size is adjusted frequently to match TBP's transmissions to available network capacity.
(3) Transmit Budget—TBP also controls its flow of transmissions by limiting the rate at which data (including retransmissions) may be transmitted. This is referred to in the source code as "smoothing" transmissions. This is done by calculating the desired transmit rate in bits per second and then periodically (typically every 10 or 20 milliseconds) increasing a connection's transmit budget by the appropriate number of bits (up to a maximum). The transmit budget is decremented by the packet size of each data packet as it is transmitted. The transmission of control packets (ACKs, POLLs, SACKs, etc.) do not decrement the transmit budget as their impact on network capacity is considered to be inconsequential. The next packet (either in-sequence or retransmission) is permitted to be transmitted when the transmit budget is non-negative prior to transmission.

2.3. ACK and SACK Transmission:

The TBP, unlike previous PEP backbone protocols which are optimized for satellite networks, is more concerned with accurately controlling its transmissions than with minimizing ACK packet transmission. In general, an acknowledgement is sent to a TBP peer in the acknowledgement field of each the following: DATA packet, ACK packet, and SACK packet. A pair of timers (the ack_timer and sack_timer), per connection, control the transmission of ACK and SACK packets respectively.

The ACK timer (and ACK packet transmission) works as follows:

(1) The TBP checks the ACK timer once every background loop. This is currently every 20 milliseconds on the IPGW and every 10 milliseconds on the HN7700SR. The ack_timer expires after 25 milliseconds and expiration triggers an ACK transmission. This can result in one ack per data packet when the terrestrial network is relatively slow (e.g., less than 400 kbit/sec).
(2) The ack_timer is started whenever the timer is not running and a data packet (whether in or out of sequence) is received which did not require an immediate ack transmission (did not have the FLAG_ACK Flags field bit set).
(3) The reception of a DATA packet with the FLAG_ACK Flags field bit set triggers an immediate ACK transmission and the stopping of the ack_timer. This bit is set in a data packet when an acknowledgement is being used to accurately measure round-trip time.
(4) The TBP sets a data packet's FLAG_ACK Flags field bit when it requires an accurate round-trip time measurements. Specifically, this happens when:
 (4)(a) The packet is the last packet to fit within the transmit window (thus starting a "last-packet" round-trip time measurement); or
 (4)(b) The packet is transmitted when the connection is known to be lightly loaded (that is there is very little or no unacknowledged data) thus starting a lightly loaded round-trip time (LLRTT) measurement.

The sack_timer (and SACK packet transmission) works as follows:

(1) The TBP sends a SACK packet instead of an ACK packet (and starts the sack_timer) whenever the TBP has received out-of-sequence packets. The SACK informs the peer of the set of out-of-sequence packets that need no retransmission. From this the peer may infer the set of packets which require retransmission.
(2) The TBP restarts sack_timer whenever a SACK packet is transmitted and the desired number of SACK retransmissions has yet to be fulfilled. TBP intentionally transmits a SACK packet three times to prevent the moderate loss of SACK packets from significantly impacting the SACK retransmission mechanism.
(3) The sack_timer expires after 40 milliseconds. TBP sends a SACK packet with up-to-date acknowledgement field and SACK blocks on sack_timer expiration.

2.4. ACK Capacity Utilization Model:

The table in FIG. 13 provides a fairly accurate model of how much network capacity is utilized carrying acknowledgements during a bulk transfer comparing TBP to ordinary TCP. In the table, ack statistics for listed and compared between TBP and most implementations of TCP, for various data rates. Specifically, the ack statistics of: 1) acks per sec, 2) ack traffic % of bytes with IPSEC, 3) ack data burst induced jitter (ms), and 4) ack data burst induced jitter (bytes), is compared between TBP and TCP. The model incorporates a data packet size of 1200 bytes, which results in a data packet size of 1334 bytes, with the IPSEC overhead. The approximate ack size, including IPSEC overhead, is 150 bytes.

2.5. DATA Packet Retransmission:

The TBP packet retransmission assumes that a TBP connection's packets are usually carried by the network in-order. It operates correctly, but less efficiently when the network actually performs out-of-order delivery. The DATA packet retransmission takes place as quickly as permitted by the transmit smoothing mechanism as soon as:

(1) The TBP may be confident that the previous transmission of the packet was lost; or
(2) When the absence of acknowledgements from the peer indicate possible packet loss and there is very little unacknowledged data. This is referred to as a "Go-Back-N" retransmission which takes place together with a TBP poll transaction.

The TBP may be confident that the previous transmission of a packet was lost when the packet has never been retransmitted and when TBP receives a SACK packet that fails to acknowledge the packet, but does acknowledge packets transmitted with higher sequence numbers than the packet in question. The TBP may also be confident that the most recent retransmission of a data packet was lost when:

(1) A packet which was transmitted for the first time after the packet's retransmission is acknowledged; or
(2) A TBP poll transaction completes and the packet is unacknowledged and the packet was not transmitted for the first time after the TBP poll request (that is, when the packet's sequence number is less than TBP Poll request packet's sequence number).

2.6. TBP Poll Transaction:

The TBP (and TBP) uses a selective ACK mechanism to recover from most data packet loss. The TBP Poll transaction is used to recover from special cases such as the last packet's transmission being lost, or all of the SACK packets being lost. When appropriate, TBP sends a TBP poll request to its peer. The peer responds to a TBP poll request packet with a TBP Poll response packet. The TBP Poll response packet has an up-to-date ACK field and, if needed, SACK information. When such a transaction has completed, TBP may be confident that any transmissions prior to the TBP poll request which remain unacknowledged were lost. The TBP maintains a single timer to control TBP Poll-Request transmission which is referred to as the Poll Transmission Timer. The Poll Transmission Timer runs whenever there are unacknowledged packets and is restarted whenever:

(1) A data packet is sent for the first time. Such a packet, if received, should generate an ACK/SACK transmission from the peer.
(2) A received ACK (or SACK) from the peer acknowledges packets which were previously unacknowledged. The flow of acknowledgements means that subsequent acknowledgements are probable and a TBP Poll transaction is not required.
(3) A SACK is received. The flow of acknowledgements means that subsequent acknowledgements are probable. The flow of acknowledgements means that subsequent acknowledgements are probable and a TBP Poll transaction is not required.
(4) A Poll Transmission Timer expiration took place and a TBP Poll request is being sent to start a TBP Poll transaction.

The timer duration for the start of the first TBP Poll Request is the round-trip time value (rto) which is close to the lightly loaded round-trip time. The timer duration jumps to twice the last-packet round-trip time should the timer expire prior to a previous TBP Poll transaction being completed. The transmission of a TBP Poll request triggers a set of Go-Back-N retransmissions when conditions are favorable. Conditions are favorable when:

(1) There is only a limited amount of unacknowledged data (compile time constant less than 3200 bytes).
(2) There is no urgent need for a lightly-loaded round-trip time or the neighbor TBP connections are not idle which precludes a lightly-loaded round-trip time measurement.
(3) The transmit window size is greater than maximum length 10 packets. When it is less than 10 packets the Go-Back-N algorithm prevents the accurate last-packet round-trip time measurement.

When conditions are favorable, all of the unacknowledged packets are retransmitted immediately after the TBP Poll request. The transmissions are being made at a time when the link is not heavily loaded (as there is not much traffic unacknowledged) and where there is a good chance that the retransmissions will reduce response time for the packets in question. Upon receiving a TBP Poll response packet, TBP evaluates each unacknowledged data packet and retransmits those which packets should be retransmitted (as described in the DATA Packet Retransmission section).

2.7. Bulk Transfer Throughput Measurement:

The TBP monitors transmit bulk transfer throughput of a connection as a way of monitoring general network performance. The bulk transfer throughput measurement produces a valuable metric of network performance. The basic idea is to measure the throughput when one has found a 10 second interval where TerrB has been consistently sending packets while a backlog of packets waiting to be sent exist. This is an indication that a bulk transfer has been occurring during that interval and that the backbone connection has been going as fast as it can. The conditions for an accurate measurement are further qualified by having an average packet size that is greater than THRUMEASUREMENTMINPKTSIZEIN-BYTES (compile time constant, 800 bytes) and by having the neighbor TBP connections idle throughout the interval. A neighbor connection is a connection that shares the same end-points. The most recent measurement and the 8 period exponential moving average of past measurements is exported as a performance statistic.

2.8. Packet Loss Measurement:

The TBP ordinarily operates with the packet retransmission timeout set to a low value (something close to the lightly loaded round-trip timeout). The Go-Back-N retransmission policy may trigger the retransmission of packets which were not actually lost. This is an intentional response time vs network efficiency tradeoff where very occasionally unused capacity is consumed in a fashion which may help response time. As such retransmissions alone cannot be used to measure packet loss. Instead packet loss measurement takes place as follows:

(1) Each data packet transmission is flagged as either an initial transmission or a retransmission.
(2) The receiver examines each data packet as it is received. A packet loss is counted when a data packet is received which is flagged as a retransmission and which has not been previously received.

(3) The receiver passes the least two significant bits of its lost packet count to its peer in the header's Window field allowing a TBP node to monitor the packet loss of its transmissions. A TBP node, upon receiving a lost packet count in a Window field which is different from the previous lost packet count updates its packet loss count by the modulo 4 difference between the previous and current values. The TBP node thus is able to accurately count the packet losses of its transmissions. It may underestimate its packet loss when the packet loss is so large that the packet loss count in the Window field may "wrap-around" between a node's receiving successive ack's from its peer. This is acceptable because such a packet loss condition is so egregious that even an the underestimation would indicate significant packet loss and be a cause for alarm.

3. TBP Latency-Based Flow Control:

The TBP is designed to measure network conditions and adjust its transmissions to match those conditions. TBP is designed to provide higher-performance than other transport protocols (including TCP) especially in the presence of significant packet loss.

3.1. TCP's (and Other Transport Protocols) Flow-Control Mechanism Shortcomings:

The TBP implements a flow-control mechanism which is significantly different from that of TCP and similar protocols in-order to overcome the following shortcomings of those mechanisms:

(1) Traffic Spikes—The flow control mechanism of most transport protocols, including TCP, involves adjusting a transmit window and then allowing the transmission of packets provided the amount of unacknowledged data remains below the size of the transmit window. This tends to cause spikes of traffic to hit the network. This occurs when a connection with no unacknowledged data is suddenly offered a burst of data to transmit. When this occurs, the network is instantaneously offered up to a full window size of data. This burst of data can overflow the buffers of network routers causing packet loss. Even when the buffers do not overflow enough to cause traffic loss the surge of data can cause a significant (multisecond) increases in response time for packets belonging to other connections which must traverse the same network buffers.

(2) Induced Packet Loss And Response Time Impact On Other Applications—The flow control mechanism of most protocols causes the protocols, when performing a bulk transfer, to progressively open their transmit window until congestion is detected. These protocols typically use packet loss to detect congestion. Thus, when performing a bulk transfer, these protocols will progressively increase their transmission rate until they overflow router buffers. This again causes packet loss and increased response time for applications belonging to another traffic stream which must share the network buffers.

(3) Inefficient Capacity Utilization—The flow control mechanisms of most protocols have a "slow-start" mechanism where the transmit window (and thus transfer rate) starts small and increases gradually until packet loss is induced. Upon experiencing traffic loss, the protocol immediately and dramatically reduces its transmit window size (and transfer rate). Thus, much of the time, the protocol does not fully utilize available network capacity.

(4) Packet Loss Intolerance—The flow control mechanisms of most protocols treat packet loss as an indication of congestion and drastically reduce their transmit window (and thus transfer rate) in the presence of packet loss. When the packet loss is due to line errors rather than congestion, effective throughput falls drastically. Furthermore, the retransmission mechanisms of most protocols have a separate, longish timeout running for each packet. This results in a packet loss recovery taking a long time (and thus applications having poor response time) in the presence of packet loss.

3.2. TBP Flow-Control Mechanism Fundamentals:

The TBP Flow-Control Mechanism operates on a per-backbone connection basis. The mechanism is based on creating an estimate of network capacity based on pair of round-trip time measurements, referred to as the lightly-loaded round-trip time (LLRTT) and the last-packet round-trip time (LPRTT). These two measurements are taken as frequently as conditions allow. For example, no measurements can be taken when the connection is idle. When an LPRTT measurement is made, TBP performs some fairly complicated algebra to estimate available network capacity. This algebra is documented in subsequent sections. The resulting estimate is used to control transmissions by establishing a peak transmission rate, which limits the rate (in bits/sec) that a connection may transmit, and a transmit window, which limits, in bytes, number of unacknowledged bytes the connection may have outstanding at any given time.

This section provides details for each of the following: (1) Lightly Loaded Round-Trip Time (LLRTT) Measurement; (2) Last Packet Round-Time Trip (LPRTT) Measurement; (3) Transmit Rate Limitation—how the transmit rate limit is enforced; (4) Transmit Window And Transmit Rate Calculation; and (5) Cleanup Mechanisms—to adjust to conditions where the most-recent measured RTTs may be off or where the flow-control mechanism is persistently overflowing network buffers causing drastic packet loss.

3.3. Lightly-Loaded Round-Trip Time (LLRTT) Measurement:

The LLRTT measurement mechanism attempts to measure a connection's round-trip time when there is no other significant traffic that might increase that round-trip time measurement. This other traffic might be on another TBP connection which is going to the same destination node (e.g., referred to as a neighbor connection), or on the same TBP connection.

3.3.1. Neighbor Idle Monitoring:

A neighbor connections are those which share the same end-point nodes. The TBP maintains, for each connection, a timestamp of the most recent time it transmitted or received a packet larger than NONIDLEPKTSIZETHRESH (150 byte compile time constant). A neighbor connection is considered idle when it has been at least one LLRTT since such a transmission or reception.

3.3.2. LLRTT Measurement Details:

The SYN/SYNACK/ACK exchange provides the initial LLRTT measurement. After the connection is established, the LLRTT is updated as follows:

(1) A packet is identified as an LLRTT candidate when, prior to its transmission, the connection has less than LLRTT_THRESH (1 compile time constant) packets unacknowledged and there are no other LLRTT candidates which are unacknowledged.

(2) An LLRTT candidate, when it is sent, has its header's ACK_FLAG Flags bit set indicating that an acknowledgement should be returned immediately thus facilitating an accurate round-trip time measurement. TBP records a timestamp of when an LLRTT packet is sent.

(3) Retransmission disqualifies a packet as an LLRTT candidate.

(4) The transmission of an TBP poll between when the LLRTT candidate is transmitted and acknowledged disqualifies an LLRTT packet.

(5) When a packet is acknowledged and it is an LLRTT candidate, its neighbor TBP connections are checked. No LLRTT measurement proceeds if any neighbor is not idle.

(6) Otherwise, an LLRTT measurement is taken.

(7) The connection's LLRTT value is ordinarily updated according to an 8 period exponential moving average.

(8) Forced LLRTT measurements are taken when there have been no measurements for a long time and one is needed (see the discussion of the ForceLLRTT state machine below). When "Forced LLRTT Measurements" are taking place, the connection's LLRTT value is directly assigned with the first such LLRTT measurement and is updated according to a 4 period exponential moving average.

(9) The size of the packet used to measure the LLRTT is significant when available capacity is relatively low speed (e.g. under 400 kbit/sec). TBP maintains an exponential running average of the size of the LLRTT candidate packet along with the LLRTT measurement itself.

(10) The LLRTT is set to the last-packet round-trip time (LPRTT) measurement should it come in below the LLRTT. This is because such a situation indicates that the LLRTT is stale and in accurately overestimated the actual current lightly loaded round-trip time.

3.4. Last-Packet Round-Trip Time Measurements:

A last-packet is a packet which fills the transmit window. After this packet is transmitted, no further full-sized packets may be transmitted until at least one is acknowledged. As such, a last-packet round-trip time is able to measure the round-trip time when the link is fully loaded. No further data will be buffered in the network causing greater buffer delays. When a packet is permitted to be transmitted by the transmit window (but perhaps not by the transmit rate limiter), it is checked to see if it "fills" the transmit window. When that is the case it is flagged as a last packet and its packet header's ACK_FLAG Flags bit is set to trigger an immediate acknowledgement of the packet thus facilitating an accurate round-trip time measurement. Retransmission disqualifies a packet as an LPRTT candidate. When an LPRTT candidate is acknowledged, its round-trip time is measured and the connection's last_pkt_rtt (LPRTT value) is assigned this value. An 8 period exponential moving average (filtered last_pkt_rtt) is also maintained to facilitate the processing of unexpectedly large changes to the LPRTT. Once an LPRTT measurement is completed the key flow control parameters (transmit window size and transmit rate limit are recomputed).

3.5. Transmit Rate Limitation Mechanism:

This section details how each TBP' connection's transmit rate is limited to the rate limit computed in the section that follows. The TBP gets a chance to transmit a data packet when any of the following events occur:

(1) A data packet is submitted by PEP for transmission to the peer and that data packet fits within the transmit window.

(2) A packet is received from the peer that acknowledges one or more data packets thus potentially permitting the transmission of packets awaiting their initial transmission.

(3) A packet is received from the peer and that packet triggers one or more retransmissions.

(4) A period of time has elapsed. Periodically, each connection is given an opportunity to:

(4)(a) Transmit any packets that are permitted to be transmitted by the transmit window but which were not permitted to be transmitted by the transmit rate limit.

(4)(b) Retransmit any packets which were not permitted to be transmitted by the transmit rate limit.

(4)(c) Process timeouts which may trigger the retransmission of data packets.

For the transmission of any such packet to be permitted it must pass the transmit rate limiter which works as follows:

(1) Each connection maintains a budget of bits which it is authorized (by the transmit rate limiter) to transmit. Whenever this budget is non-negative a packet may be transmitted. The transmission of the packet causes the budget to be reduced (possibly going negative) by the size of the packet (in bits).

(2) When a connection is periodically given an opportunity the connection's budget is increased by the number of bits allowed by the peak_thru_bits_per_sec rate limit (whose computation is discussed below) and the number of milliseconds that have elapsed since the previous background call. The increase is capped by max_tx_budget which is the number of bits that are expected over the course of two typical opportunities. Thus full rate transmission is permitted provided opportunities are provided in a nearly periodic fashion and yet spikes in transmission will not occur should an opportunity be delayed or should a burst of data be offered for transmission after an idle period.

3.6. Transmission Stalling:

A TBP connection's transmission is said to stall when, for whatever reason, the connection cannot transmit another packet. Tracking transmission stalling (with statistics and other variables) is useful for understanding how a connection is performing. There are basically three different reasons for a connection stalling:

(1) Backlog Stall—the connection could transmit another packet, but no such packet has been submitted by TBP's client for transmission.

(2) Budget Stall—packets are ready to be transmitted, but they cannot because the transmit rate limiter does not permit it.

(3) Window Stall—packets are waiting to be transmitted and the budget is not negative and thus would permit a transmission, but the next packet to be transmitted does not fit within the transmit window.

In particular, having a connection have only budget stalls for a long period of time is undesirable because without window stalls there will be no last packet round-trip time measurements and thus the flow-control mechanism is not able to adjust to changing network conditions.

3.7. Transmit Window/Transmit Rate Update Calculations:

This section provides a detailed walk thru of the main-line calculations performed by to recomputed a connection's key flow control parameters. The key parameters are the transmit window size in bytes, and the transmit rate limit.

3.7.1. Integer Arithmetic and Overflow Avoidance:

All of the calculations are performed using 32-bit integer arithmetic with special care to avoid situations in which integer overflows may occur. This usually involves three different calculations for each conceptual calculation:

(1) Determine if an overflow is at risk.

(2) Calculate most accurately if no overflow will occur (by saving integer division until the end of the calculation).

(3) Calculate less accurately, but avoid overflow, by putting integer division earlier in the calculation when an overflow is at risk.

Provisions are also made in the code to be very sure that divide by zero exceptions will not occur.

3.7.2. When an Ordinary Window Update does not Occur:

An ordinary transmit window update occurs only when there have been no TBP poll requests sent or poll responses received as the acknowledgement of the LPRTT candidate may be due to an TBP poll transaction (triggered by loss of ack-bearing packets from the peer) which gives an incorrectly large round-trip time measurement. An ordinary transmit window update also does not occur while Forced LLRTT measurements are underway as these LPRTT measurements do not measure a truly heavily loaded network.

3.7.3. Configuration Parameters:

The basic idea of the TBP's flow control mechanism is to control transmission so that enough data is buffered up in the network to ensure that the network's capacity is saturated, but not so much data that it either overflows network buffers or causes undue latency increases. Network buffer overflows are more likely (and the limiting factor) at when the network is operating at high-bit-rates while latency increases are more likely (and the limiting factor) at low rates. A pair of configuration parameters (which ordinarily do not need to be adjusted) provides targets for these two criteria:

(1) pepGenCfTerrExtraLatency (default 100 ms)—identifies how much data is targeted for pile up in network buffers in terms that piling up causing latency increases.

(2) pepGenCfTerrBufferBytes (default 150000 bytes)—identifies how much data is targeted for pile up in network buffers. This amount of data should not cause buffer overflows (and thus packet loss). A DSL circuit may buffer 35 1500-byte packets prior to causing packet losses. The default value was selected to make the pepGenCfTerrExtraLatency parameter be the controlling parameter as this best allows TBP to adapt properly to higher-speed networks.

The basic idea of the algorithm is to select the transmit rate limit and transmit window size such that data piles up in the network, but not so much that either of the above targets are grossly violated.

3.7.4. Congestion Threshold:

The overall calculation of the transmit window and transmit rate limit begins with a calculation of the desired congestion threshold, that is, the Last Packet Round-Trip Time which means that the network has the desired amount of data piled up. The congestion threshold is the sum of:

(1) The Lightly Loaded Round-Trip Time (adjusted to take into account the size of the packets upon which the measurement was taken) plus a smallish fudge factor adjustment that accounts for processing time in the TBP platform based on how often the TBP gets background execute calls.

(2) The lesser value of either the target extra latency or how long it takes the network (at its estimated speed) to transmit the target number of buffered bytes. This is the delay associated with a packet moving thru the network queues when the target amount of data is piled up.

3.7.4.1. Estimating Network Capacity:

To the extent that the last packet round-trip time is less than the congestion threshold, TBP's prior estimated network capacity underestimates actual network capacity. Thus:

```
preliminaryNextEstimatedNetworkCapacityBitsPerSec =
    (estimatedNetworkCapacityBitsPerSec / lastPacketRttMs) *
    CongestionThresholdMs;
```

To avoid overflowing buffers (or inducing undue buffer delay latency) when increasing the estimated network capacity, the next estimated network capacity's increase is limited by the expected impact on buffer depth and buffer delay. Thus the increase in estimated network capacity is limited by the minimum of:

```
/* one quarter of the target number of network buffering bytes as paced by
a transmission rate based on the lightly loaded round-trip time */
    bufferBasedMaxDeltaEstimatedNetworkCapacityBitsPerSec =
        ((targetNetworkBufferingBytes / 4) * 8) /
        (lightlyLoadedRoundTripTimeMsBkgAdjusted / 1000);
```

And:

```
/* The capacity increase that can be expected to induce the target network
buffering delay if it persists above network capacity for one lightly-loaded
round trip. */
    latencyBasedMaxDeltaEstimatedNetworkCapacityBitsPerSec =
        (estimatedNetworkCapacityBitsPerSec * targetExtraLatencyMs) /
        lightlyLoadedRoundTripTimeMsBkgAdjusted;
```

Decreases in the estimated network capacity are not filtered or limited. The nextEstimatedNetworkCapacityBitsPerSec is set to preliminaryNextEstimatedNetworkCapacityBitsPerSec but with the increase to nextEstimatedNetworkCapacityBitsPerSec limited by the minimum of bufferBasedMaxDeltaEstimatedNetworkCapacityBitsPerSec and latencyBasedMaxDeltaEstimatedNetworkCapacityBitsPerSec.

3.7.5. Calculating the Next Transmit Window Size:

The rule of thumb is that for a network with unlimited capacity and a fixed latency that the transmit window size must be at least the desired capacity/round-trip time. This is the starting point for calculating the transmit window.

```
llrttEncpWindowSizeBytes = (nextEstimatedNetworkCapacityBitsPerSec *
    lightlyLoadedRoundTripTimeMsBkgAdjusted) / 8000;
```

In embodiments, this may be very small, when the round-trip time is very small. In dealing with scenarios where the round-trip time is very small, the window size should be large enough so that when data piles up in the network the lesser of the target number of bytes or target network buffering extra latency occurs. The alternative window size:

```
windowSizeAlternative =
    MIN((((nextEstimatedNetworkCapacityBitsPerSec / 1000) *
    targetExtraLatencyMs) / 8), targetNetworkBufferingBytes);
```

There is a lower bound on the transmit window size in packets of MIN_TX_WIND (compile time constant of 3 packets). The next transmit window size, in bytes, is the minimum of these llrttEncpWindowSizeBytes and windowSizeAlternative. In various embodiments, at least MIN_TX_WIND packets to be unacknowledged, even if this exceeds the transmit window size in bytes.

3.7.6. Finalizing the Transmit Rate Limit:

A last packet round-trip time (LPRTT) is measured when a packet which fills the transmit window is transmitted. Thus it is crucial (to keep a flow of LPRTT measurements going) to make sure that the transmit rate limit is high enough that the transmit window will be filled. Under normal circumstances, the following code achieves this.

```
/* Peak throughput should always allow the window size to get thru in
the lightly loaded round-trip time. */
    long int lowerBoundPeakThruBitsPerSec = (windowSizeBytes * 8000)
        / lightlyLoadedRoundTripTimeMsBkgAdjusted;
    long int peakThruBitsPerSec = (nextEstimatedNetworkCapacityBitsPerSec
        > lowerBoundPeakThruBitsPerSec) ?
            nextEstimatedNetworkCapacityBitsPerSec :
            lowerBoundPeakThruBitsPerSec;
```

3.8. Special Mechanisms:

To achieve its goals, the TBP must have accurate lightly-loaded round-trip time measurements and last-packet round-trip time measurements. Lightly loaded measurements come naturally enough, provided a single, very-long bulk transfer is not taking place (and provided all the neighbor connections are not active at the same time). Last packet round-trip time measurements occur naturally enough provided there are bulk transfers and the available network capacity is close enough to avoid constant buffer overruns. A sudden reduction in network capacity can result in a situation where enough packet loss occurs to for packet retransmissions such that last-packet round-trip time measurements cannot accurately take place. The TBP has a set of mechanisms to attempt to ensure that a connection's lightly-loaded round-trip time value and last-packet round-trip time are kept reasonably accurate and that TBP continues to operate with good performance even in the face of exceptional conditions. The subsections that follow detail these mechanisms.

3.8.1. ForceLLRTT State Machine:

The TBP maintains a state machine that will force LLRTT measurements if long periods of time occur without such a measurement. The duration of time depends on how much difference there was between the previous LLRTT measurement compared to the filtered LLRTT value. When the error is relatively large, an LLRTT measurement will be forced sooner. The basic idea is that in TBP mode bad things happen if the lightly loaded round trip time is wrong. If it is underestimated, then bulk transfer throughput is less than what the network supports. If it is overestimated, then too much data is allowed to pile up in the network. During a bulk transfer one can't measure the lightly loaded round trip time (because the link is not lightly loaded). The ForceLLRTT State machine is a mechanism to force these measurements. The prevLLRTT-MeasurementOrTxIdleTick (a timestamp), forceLL-RTTState and numForcedLLRTTAttempts per-connection variables support this mechanism.

The prevLLRTTMeasurementOrTxIdleTick maintains a timestamp when either of the following most recently occurred: (a) Last successful lightly loaded round-trip time measurement; or (b) Last moment when there were no packets waiting to be transmitted. The numForcedLLRTTAttempts maintains a count of the number of lightly loaded round-trip time measurement attempts (packets sent with no other unacknowledged packets) that were triggered because of such a long, uninterrupted bulk transfer. The forceLL-RTTState is a state variable controlling the overall mechanism which is in one of the following states: (a) Normal—it has not been too long since the timestamp was set; (b) Waiting—it has been too long since the timestamp was set, but the neighbor TBP connections are not idle; (c) Clearing—the other connections are idle, allow no new packet transmissions until all packets are acknowledged; or (d) Measuring—allow packets to be transmitted one at a time thus measuring the lightly loaded round-trip time.

The state transition table is as follows (current state, next state—state input):

(1) Normal, Waiting—timeout since timestamp reset.
(2) Normal, Clearing—timeout and neighbors not idle.
(3) Waiting, Clearing—all neighbor connections idle.
(4) Waiting, Normal—timestamp reset.
(5) Clearing, Measuring—all data packets acknowledged.
(6) Clearing, Normal—neighbor connections are not idle.
(7) Measuring,Normal—enough data packets sent one at a time to get a good chance at getting LLRTT measurements.
(8) Measuring,Waiting—neighbor connections are no longer idle.
(9) Measuring,Normal—there are no packets waiting to be transmitted.

The updating of the lightly loaded round trip time (llrtt bcb member) is different when the measurement is forced by this mechanism. The first such measurement is recorded as the LLRTT, skipping the usual exponential moving average filter. Subsequent forced measurements are update Urn via a shorter-period EMA. The transmission of data packets is controlled by locking down the transmit window when needed. As such, data packet transmissions is a function of the states as follows: (1) Normal—transmit a packet when it fits in the window; (2) Waiting—transmit a packet when it fits in the window; (3) Clearing—transmit no new packets; or (4) Measuring—operate with a window size of 1 packet.

3.8.2. Last Packet RTT Inducing Mechanisms:

Ordinarily during a bulk transfer, last packet RTT measurements should occur approximately once per transmit window. The TBP has a couple of mechanisms that it invokes to provoke last packet RTT (LPRTT) measurements. They involve:

(1) Determining that a bulk transmission has been going on for some time with no last packet measurements,
(2) Gradually shrinking the transmit window without correspondingly adjusting the transmit limiter's rate limit.
(3) Gradually increasing the transmit limiter's rate limit. Without correspondingly increasing the window size, causes the window size to be the limit on packet transmission and thus provoke LPRTT measurements. This mechanism is invoked when the transmit window has already been reduced as far as MIN_TX_WIND permits.
(4) Drastically shrinking the window size down as far the MIN_TX_WIND permits. This mechanism is used only when the earlier mechanisms have failed to produce a Last Packet round trip time as there are limits on how quickly the window size can increase and such a drastic reduction will reduce throughput inordinately if performed when it is not needed. It is needed in situations where somehow the transmit rate and window has been so grossly oversized that a flood of packet losses prevents the last packet round-trip measurements from occurring such that they can downwardly adjust the transmit rate and window size.

These mechanisms are performed along with the other activities that occur when a connection is periodically given an opportunity to transmit.

3.8.3. Drastic Packet Loss:

When there is drastic packet loss (>30%) with TBP Poll transactions take place, there is a good chance that the TBP is severely overdriving the network. This can happen when there is a sudden collapse in available bandwidth. When this occurs, the TBP shrinks its transmit window and transmit rate to such a low value that at most the target network buffer depth can result.

3.8.4. Target Extra Latency and Buffering on Persistent Drastic Packet Loss:

The flow control algorithm, when operating across network devices with limited packet buffering, typically results in drastic packet loss (defined by a compile-time constant as 10%). This mechanism was introduced after the Carter's customer's iDSL lines were measured to have download packet buffering on less than 2 full-sized packets. This mechanism implements a mechanism to adjust the targets down when that kind of packet loss persists (and to elevate the targets back to their configuration parameter limits when the packet loss disappears). The function is called whenever there is a LPRTT measurement and there have been at least 100 packets transmitted since the previous call. The basics of how the adjustment is made is as follows:

(1) The step size for target adjustment is $\frac{1}{16}^{th}$ the difference between the configured value and the minimum value (10 ms).
(2) The target latency and network buffering is decreased one step whenever there have been two consecutive calls with drastic packet loss.
(3) The target latency and network buffering is increased one step when there have been no calls with a drastic packet loss in the last five minutes.
(4) The target is "popped" back up to the configured values when there have been 20 consecutive calls with drastic packet loss while at the minimum value. Such a situation indicates that there is a cause for the packet loss other than overflowing network buffers.
(5) After a "pop" reductions are suspended for at least 10 minutes.

4. MSS Spoofing:

The Maximum Segment Size (MSS) is the largest chunk of data that TCP will send to the other end. When a connection is established, each end can announce its MSS. If one end does not receive an MSS option from the other end, a default of 536 bytes is assumed. The MSS, when sent to the other end, is sent to the other end in an MSS option field that resides within the TCP header of the connection establishment packets (SYN and SYNACK). The enhanced PEP edits the SYN and SYNACK packets which have an MSS option field and, when the value present exceeds the value determined to be optimal for the underlying network, the value is replaced with this optimal value and the TCP header checksum is modified so that the header has a valid checksum with the revised MSS value. In other words, the MSS for the spoofed TCP SYN and TCP SYNACK is set or trimmed to the preferred value when processing the spoofed TCP connection establishment. The result of this editing is that the MSS is kept below a level which would cause fragmentation.

Therefore, in various embodiments, the optimized TCP PEP can use round trip delay, instead of packet loss, to perform TCP flow control. Instead of the customary TCP windowing mechanism, the packets may be actually paced according to an algorithm. That is, problems may occur in normal TCP when sending instantaneous bursts that approach the TCP transmit size. If a pause occurs in the transmission of a large burst, the initial burst of traffic upon re-transmission of the large burst ruins the latency in the network, and if extreme, may cause packet loss. The optimized TCP PEP solves this problem by using a flow control mechanism that measures round-trip packet delay using an algebraic algorithm, and determines an optimal TCP window size and pacing rate (i.e., transmission rate).

The present invention provides an efficient networked system for transmissions to and from a remote site. While the present invention is applied to a VPN system, it not limited to such. For example, the present invention can be applied to a non-VPN system. It will be understood that the present invention can be applied to any other type of network, communications, or integrated system which may benefit from the present invention.

While the present invention describes various embodiments containing hardware and/or software, and unless stated otherwise, all functions are performed by a CPU executing computer executable programming code stored in a non-transitory memory or computer-readable storage medium, it will be understood that any of those various components can be alternatively implemented in hardware, software, or a combination thereof.

Except as otherwise disclosed herein, the various components shown in outline or in block form in the figures are individually well known and their internal construction and operation are not critical either to the making or using of this invention or to a description of the best mode of the invention.

While the invention has been described in connection with a number of embodiments and implementations, the invention is not so limited but covers various obvious modifications and equivalent arrangements, which fall within the purview of the appended claims. Although specific embodiments of the present invention have been described above in detail, it will be understood that this description is merely for purposes of illustration. When it is said that something "is", "shall", "will", or "should be" the case, for example, these expressions are not meant to limit the invention, but are merely providing a specific example or specific examples. Various modifications of and equivalent structures corresponding to the disclosed aspects of the various embodiments in addition to those described above may be made by those skilled in the art without departing from the spirit of the present invention which is defined in the following claims, the scope of which is to be accorded the broadest interpretation so as to encompass such modifications and equivalent structures. Although features of the invention are expressed in certain combinations among the claims, it is contemplated that these features can be arranged in any combination and order.

What is claimed is:

1. A method for managing transmission characteristics for data communications between a first network site and a remote second network site of a wide area data communications network, wherein the data communications occur over a series of links of the data communications network, the method comprising:
   obtaining configuration information regarding a first node device of the first network site, wherein the configuration information reflects one or more transmission characteristics of the first node device with respect to outbound data communications transmitted to the second network site via a first link of the series of links of the data communications network, wherein the first link is between the first node device and a second node device serving as an entry point to a public portion of the data communications network;
   determining one or more outbound link throughput limits for the outbound data communications, wherein at least one of the outbound link throughput limit(s) is/are determined based on at least one of the transmission characteristic(s) of the first node device; and applying the outbound link throughput limit(s) to transmission of data packets of the outbound data communications; and wherein the configuration information is obtained by: sending a Simple Network Management Protocol (SNMP) request to the first node device for a device descriptor variable of the first node device and receiving a respective device descriptor value in response to the SNMP request; matching the received device descriptor value to a corresponding device identifier within a device management database, and retrieving one or more corresponding device SNMP variable types from the device management database; and polling the first node device for a respective device value corresponding to each of the one or more device SNMP variable types, wherein the device values reflect the configuration information.

2. A method according to claim 1, wherein the configuration information further reflects one or more outbound protocol characteristics regarding the outbound, wherein the outbound protocol characteristic(s) reflect one or more network protocols applied to the outbound data communications over at least a portion of the links of the data communications network, the method further comprising:
determining one or more outbound protocol overhead factors based on overhead associated with at least one of the outbound protocol characteristic(s), and
wherein at least one of the outbound link throughput limit(s) is/are based on at least one of the outbound protocol overhead factor(s).

3. A method according to claim 2, wherein at least one of the outbound link throughput limit(s) include(s) one or more of a path maximum transmission unit (MTU) and a maximum segment size (MSS).

4. A method according to claim 2, wherein the outbound protocol characteristic(s) include(s) one or more of a wide area network (WAN) protocol type and an asynchronous transfer mode (ATM) encapsulation mode configured on the first node device for the transmission of the outbound data communications via the first link.

5. A method according to claim 2, wherein the configuration information further reflects one or more reception characteristics of the first node device with respect to receipt of inbound data communications transmitted from the second network site and received by the first node device from the second node device via the first link, the second node device further serving as an exit point from the public portion of the data communications network, the method further comprising:
determining one or more inbound link throughput limits for the inbound data communications, wherein at least one of the inbound link throughput limit(s) is/are determined based on at least one of the reception characteristic(s) of the first node device; and
transmitting the inbound link throughput limit(s) to the second network site for application to transmission of data packets of the inbound data communications from the second network site.

6. A method according to claim 5, wherein the configuration information further reflects one or more inbound protocol characteristics regarding the inbound data communications, wherein the inbound protocol characteristic(s) reflect one or more network protocols applied to the inbound data communications over at least a portion of the links of the communications network, the method further comprising:
determining one or more inbound protocol overhead factors based on overhead associated with at least one of the inbound protocol characteristic(s), and
wherein at least one of the inbound link throughput limit(s) is/are based on at least one of the inbound protocol overhead factor(s).

7. A method according to claim 6, wherein at least one of the inbound link throughput limit(s) include(s) one or more of a path maximum transmission unit (MTU) and a maximum segment size (MSS).

8. A method according to claim 6, wherein the inbound protocol characteristic(s) include(s) one or more of a wide area network (WAN) protocol type and an asynchronous transfer mode (ATM) encapsulation mode configured on the first node device for the receipt of the inbound data communications via the first link.

9. A method according to claim 6, wherein the data packets of the outbound and inbound data communications are secured via a virtual private network (VPN) tunnel between the first network site and the second network site, wherein the series of links of the data communications network carry the data packets of the VPN tunnel.

10. A method according to claim 9, wherein the transmission of the inbound link throughput limit(s) to the second network site occurs via the VPN tunnel.

11. A method according to claim 6, further comprising:
receiving the inbound link throughput limit(s) transmitted to the second network site;
transmitting the data packets of the inbound data communications to the first network site; and
controlling the transmission of the data packets of the inbound data communications based on the received inbound link throughput limit(s).

12. A method according to claim 11,
wherein the data packets of the inbound data communications are secured via a virtual private network (VPN) tunnel between the first network site and the second network site, at least one of the inbound protocol characteristic(s) reflect(s) a security protocol applied to the data packets of the inbound data communications, and at least one of the inbound protocol overhead factors is based on overhead associated with the security protocol applied to the data packets of the inbound data communications, and
wherein the series of links of the data communications network carry the data packets of the VPN tunnel.

13. A method according to claim 12, wherein the VPN tunnel is based on Internet protocol security (IPSEC) protocol, and the inbound protocol characteristic(s) include IPSEC encapsulation.

14. A method according to claim 13, wherein the control of the transmission of the data packets of the inbound data communications comprises controlling an effective bit rate of the data packets transmitted from the second network site to the first network site via the VPN tunnel.

15. A network communications apparatus of a first network site, adapted for managing transmission characteristics for data communications between the first network site and a remote second network site, wherein the data communications occur over a series of links of a wide area data communications network, the apparatus comprising:
a first communications interface configured to interface with a first node device of the first network site;
a processor configured (1) to obtain configuration information from the first node device, wherein the configuration information reflects one or more transmission characteristics of the first node device with respect to outbound data communications transmitted by the first node device to the second network site via a first link of the series of links of the data communications network, wherein the first link is between the first node device and a second node device serving as an entry point to a public portion of the data communications network, and (2) to determine one or more outbound link throughput limits for the outbound data communications, wherein at least one of the outbound link throughput limit(s) is/are determined based on at least one of the transmission characteristic(s) of the first node device; and a packet scheduler configured to apply the outbound link throughput limit(s) to transmission of data packets of the outbound data communications; and wherein, for the purpose of obtaining the configuration information, the processor is configured to: send, via the a first communications interface, a Simple Network Management Protocol (SNMP) request to the first node device for a device descriptor variable of the first node device, and receive, via the first communications interface, a device descriptor value in response to the SNMP request; match the received device descriptor value to a corresponding device identifier within a device management database, and retrieve one or more corresponding device SNMP variable types from the device management database; and poll the first node device, via the a first communications interface, for a respective device value corresponding to each of the one or more device SNMP variable types, wherein the device values reflect the configuration information.

16. The network communications apparatus according to claim 15, wherein the configuration information further reflects one or more outbound protocol characteristics regarding the outbound data communications, wherein the outbound protocol characteristics reflect one or more network protocols applied to the outbound data communications over at least a portion of the links of the data communications network, wherein the processor is further configured to determine one or more outbound protocol overhead factors based on overhead associated with at least one of the outbound protocol characteristics, and wherein at least one of the outbound link throughput limits is/are based on at least one of the outbound protocol overhead factors.

17. The network communications apparatus according to claim 16, wherein at least one of the outbound link throughput limit(s) include(s) one or more of a path maximum transmission unit (MTU) and a maximum segment size (MSS).

18. The network communications apparatus according to claim 16, wherein the outbound protocol characteristic(s) include(s) one or more of a wide area network (WAN) protocol type and an asynchronous transfer mode (ATM) encapsulation mode configured on the first node device for the transmission of the outbound data communications via the first link.

19. The network communications apparatus according to claim 16, wherein the configuration information further reflects one or more reception characteristics of the first node device with respect to inbound data communications transmitted from the second network site and received by the first node device from the second node device via the first link, the second node device further serving as an exit point from the public portion of the data communications network, and wherein the processor is further configured (1) to determine one or more inbound link throughput limits for the inbound data communications, wherein at least one of the inbound link throughput limit(s) is/are determined based on at least one of the reception characteristic(s) of the first node device, and (2) to control the first communications interface to transmit the inbound link throughput limit(s) to the second network site for application to the transmission of data packets of the inbound data communications from the second network site.

20. The network communications apparatus according to claim 19, wherein the configuration information further reflects one or more inbound protocol characteristics regarding the inbound data communications, wherein the inbound protocol characteristic(s) reflect one or more network protocols applied to the inbound data communications over at least a portion of the links of the communications network, and wherein the processor is further configured to determine one or more inbound protocol overhead factors based on overhead associated with at least one of the inbound protocol characteristic(s), and wherein at least one of the inbound link throughput limit(s) is/are based on at least one of the inbound protocol overhead factor(s).

21. The network communications apparatus according to claim 20, wherein at least one of the inbound link throughput limit(s) include(s) one or more of a path maximum transmission unit (MTU) and a maximum segment size (MSS).

22. The network communications apparatus according to claim 20, wherein the inbound protocol characteristic(s) include(s) one or more of a wide area network (WAN) protocol type and an asynchronous transfer mode (ATM) encapsulation mode configured on the first node device for the receipt of the inbound data communications via the first link.

23. The network communications apparatus according to claim 20, wherein the data packets of the outbound and inbound data communications are secured via a virtual private network (VPN) tunnel between the first network site and the second network site, wherein the series of links of the data communications network carry the data packets of the VPN tunnel.

24. The network communications apparatus according to claim 23, wherein the transmission of the inbound link throughput limit(s) to the second network site occurs via the VPN tunnel.

* * * * *